US006434687B1

(12) United States Patent
Huppenthal

(10) Patent No.: US 6,434,687 B1
(45) Date of Patent: Aug. 13, 2002

(54) SYSTEM AND METHOD FOR ACCELERATING WEB SITE ACCESS AND PROCESSING UTILIZING A COMPUTER SYSTEM INCORPORATING RECONFIGURABLE PROCESSORS OPERATING UNDER A SINGLE OPERATING SYSTEM IMAGE

(75) Inventor: Jon M. Huppenthal, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 0 days.

(21) Appl. No.: 09/888,276

(22) Filed: Jun. 22, 2001

Related U.S. Application Data

(63) Continuation-in-part of application No. 09/563,561, filed on May 3, 2000, now Pat. No. 6,339,819, which is a continuation-in-part of application No. 09/481,902, filed on Jan. 12, 2000, now Pat. No. 6,247,110, which is a continuation of application No. 08/992,763, filed on Dec. 17, 1997, now Pat. No. 6,076,152.

(51) Int. Cl.[7] .............................................. G06F 15/16
(52) U.S. Cl. ...................... 712/32; 707/501.1; 707/513; 709/203; 709/219
(58) Field of Search .............................. 707/501.1, 513; 709/203, 219; 712/32

(56) References Cited

U.S. PATENT DOCUMENTS

| | | | | |
|---|---|---|---|---|
| 5,671,377 A | * | 9/1997 | Bleidt et al. | 345/723 |
| 5,715,453 A | * | 2/1998 | Stewart | 707/513 |
| 5,867,706 A | * | 2/1999 | Martin et al. | 709/105 |
| 5,987,480 A | * | 11/1999 | Donohue et al. | 707/501 |
| 6,009,410 A | * | 12/1999 | LeMole et al. | 705/14 |
| 6,128,663 A | * | 10/2000 | Thomas | 709/228 |

OTHER PUBLICATIONS

Albaharna, Osama, et al., "On the viability of FPGA-based integrated coprocessors", © 1996 IEEE, Publ. No. 0-8186-7548-9/96, pp. 206-215.
Barthel, Dominique Aug. 25-26, 1997, "PVP a Parallel Video coProcessor", Hot Chips IX, pp. 203-210.
Bittner, Ray, et al., "Computing kernels implemented with a wormhole RTR CCM", © 1997 IEEE, Publ. No. 0-8186-8159-4/97, pp. 98-105.
Babb, Jonathan, et al., "Parallelizing applications into silicon", © 1999 IEEE.
Bertin, Patrice, et al., "Programmable active memories: a performance assessment", © 1993 Massachusetts Institute of Technology, pp. 88-102.
Culbertson, W. Bruce, et al., "Exploring architectures for volume visualization on the Teramac custom computer", © 1996 IEEE, Publ. No. 0-8186-7548-9/96, pp. 80-88.
Culbertson, W. Bruce, et al., "Defect tolerance on the Teramac custom computer", © 1997 IEEE, Publ. No. 0-8186-8159-4/97, pp. 116-123.

(List continued on next page.)

Primary Examiner—Kenneth S. Kim
(74) Attorney, Agent, or Firm—William J. Kubida; Hogan & Hartson LLP

(57) ABSTRACT

A system and method for accelerating web site access and processing utilizing a multiprocessor computer system incorporating reconfigurable and standard microprocessors as the web site server. One or more reconfigurable processors may be utilized, for example, in accelerating site visitor demographic data processing, real time web site content updating, database searches and other processing associated with e-commerce applications. In a particular embodiment disclosed, all of the reconfigurable and standard microprocessors may be controlled by a single system image of the operating system, although cluster management software may be utilized to cause a cluster of microprocessors to appear to the user as a single copy of the operating system.

25 Claims, 14 Drawing Sheets

OTHER PUBLICATIONS

Chan, Pak, et al., "Architectural tradeoffs in field–programmable–device–based computing systems", © 1993 IEEE, Publ. No. 0–8186–3890–7/93, pp. 152–161.

Clark, David, et al., "Supporting FPGA microprocessors through retargetable software tools", © 1996 IEEE, Publ. No. 0–8186–7548–9/96, pp. 195–103.

Cuccaro, Steven, et al., "The CM–2X: a hybrid CM–2/Xilink prototype", © 1993 IEEE, Publ. No. 0–8186–3890–7/93, pp. 121–130.

Dehon, Andre, "DPGA–Coupled microprocessors: commodity IC for the early $21^{st}$ century", © 1994 IEEE, Publ. No. 0–8186–5490–2/94, pp. 31–39.

Dhaussy, Philippe, et al., "Global control synthesis for an MIMD/FPGA machine", © 1994 IEEE, Pub. No. 0–8186–5490–2/94, pp. 72–81.

Deshpande, Deepali, et al., "Hybrid data/configuration caching for striped FPGAs" © 1999 IEEE.

Elliott, Duncan, et al., "Computational Ram: a memory–SIMD hybrid and its application to DSP",© 1992 IEEE, Publ. No. 0–7803–0246–X/92, pp. 30.6.1–30.6.4.

Fortes, Jose, et al., "Systolic arrays, a survey of seven projects", © 1987 IEEE, Publ. No. 0018–9162/87/0700–0091, pp. 91–103.

Purna, Karthikeya, et al., "Temporal partitioning and scheduling data flow graphs for reconfigurable computers", © 1999 IEEE, Publ. No. 0018–9340/99 pp. 579–590.

Gibbs, W. Wayt, "Blitzing bits", © 1999 Scientific American Presents, pp. 57–61.

Gonzalez, Ricardo, "Configurable and extensible processors change system design", Aug. 15–17, 1999, Hot Chips 11 Tutorials, pp. 135–146.

Graham, Paul, et al., ."FPGA–based sonar processing", © 1998 ACM 0–89791–978–5/98, pp. 201–208.

Hauser, John, et al.: "GARP: a MIPS processor with a reconfigurable co–processor", © 1997 IEEE, Pub. No. 0–08186–8159–4/97, pp. 12–21.

Hammond, Lance, et al., "The Stanford Hydra CMP", Aug. 15–17, 1999 Hot Chips 11 Tutorials, pp. 23–31.

Hartenstein, Reiner, et al., "A reconfigurable data–driven ALU for Xputers", © 1994 IEEE, Publ. No. 0–8186–5490–2/94, pp. 139–146.

Hayes, John, et al., "A microprocessor–based hypercube, supercomputer", © 1986 IEEE, Publ. No. 0272–1732/86/1000–0006, pp. 6–17.

Hagiwara, Hiroshi, et al., "A dynamically microprogrammable computer with low–level parallelism", © 1980 IEEE, Pub. No. 0018–9340/80/07000–0577, pp. 577–594.

Hasebe, A., et al., "Architecture of SIPS, a real time image processing system," © 1988 IEEE, Publ. No. CH2603–9/88/0000/0621, pp. 621–630.

Jean, Jack, et al., "Dynamic reconfiguration to support concurrent applications", © 1999 IEEE, Publ. No. 0018–9340/99, pp. 591–602.

Kastrup, Bernardo, et al., "Concise: a compiler–driven CPLD–based instruction set accelerator", © 1999 IEEE.

King, William, et al., "Using MORRPH in an industrial machine vision system", © 1996 IEEE, Pub. No. 08186–7548–9/96, pp. 18–26.

Manohar, Swaminathan, et al., "A pragmatic approach to systolic design", © 1988 IEEE, Publ. No. CH2603–9/88–0000/0463, pp. 463–472.

Motomura, Masato, et al., "An embedded DRAM–FPGA chip with instantaneous logic reconfiguration", © 1998 IEEE, Publ. No. 0–8186–8900–5/98, pp. 264–266.

McConnell, Ray, "Massively parallel computing on the FUZION chip", Aug. 15–17, 1999, Hot Chips 11 Tutorials, pp. 83–94.

McShane, Erik, et al., "Functionally integrated systems on a chip: technologies, architectures, CAD tools, and applications", © 1998 IEEE, Publ. No. 8–8186–8424–0/98, pp. 67–75.

Mauduit, Nicolas, et al., "Lneuro 1.0: a piece of hardware LEGO for building neural network systems," © 1992 IEEE, Publ. No. 1045–9227/92 pp. 414–422.

Patterson, David, et al., "A case for intelligent DRAM: IRAM", Hot Chips VIII, Aug. 19–20, 1996, pp. 75–94.

Peterson, Janes, et al., "Scheduling and partitioning ANSI–C programs onto multi–FPGA CCM architectures", © 1996 IEEE, Publ. No. 0–8186–7548–9/96, pp. 178–187.

Rupp, Charley, et al., "The NAPA adaptive processing architecture", © 1998 the Authors, pp. 1–10.

Saito, Osamu, et al., "A 1M synapse self learning digital neural network chip", © 1998 IEEE, Publ. No. 0–7803–4344/1/98, pp. 94–95.

Schott, Brian, et al., "Architectures for system–level applications of adaptive computing", © 1999 IEEE.

Schmit, Herman, "Incremental reconfiguration for pipelined applications," © 1997 IEEE, Publ. No. 0–8186–8159–4/97, pp. 47–55.

Villasenor, John, et al., "Configurable computing", © 1997 Scientific American, Jun. 1997.

Stone, Harold, "A logic–in–memory computer", © 1970 IEEE, IEEE Transactions on Computers, pp. 73–78, Jan. 1990.

Trimberger, Steve, et al., "A time–multiplexed FPGA", © 1997 IEEE, Publ. No. 0–8186–8159–4/97, pp. 22–28.

Thornburg, Mike, et al., "Transformable Computers", © 1994 IEEE, Publ. No. 0–8186–5602–6/94, pp. 674–679.

Tangen, Uwe, et al., "A parallel hardware evolvable computer POLYP extended abstract", © 1997 IEEE, Publ. No. 0–8186–8159/4/97, pp. 238–239.

Tomita, Shinji, et al., "A computer low–level parallelism QA–2", © 1986 IEEE, No. 0–0384–7495/86/0000/0280, pp. 280–289.

Ueda, Hirotada, et al., "A multiprocessor system utilizing enhanced DSP's for image processing", © 1988 IEEE, Publ. No. CH2603–9/88/0000/0611, pp. 611–620.

Wang, Quiang, et al., "Automated field–programmable compute accelerator design using partial evaluation", © 1997 IEEE, Publ. No. 0–8186–8159–4/97, pp. 145–154.

Wirthlin, Michael, et al., "The Nano processor: a low resource reconfigurable processor", © 1994 IEEE, Publ. No. 0–8186–5490–2/94, pp. 23–30.

Wittig, Ralph, et al., "One Chip: An FPGA processor with reconfigurable logic", © 1996 IEEE, Publ. No. 0–8186–7458–9/96, pp. 126–135.

Wirthlin, Michael, et al., "A dynamic instruction set computer", © 1995 IEEE, Publ. No. 0–8186–7086–X/95, pp. 99–107.

Yamauchi, Tsukasa, et al., "SOP: A reconfigurable massively parallel system and its control–data flow based compiling method", © 1996 IEEE, Publ. No. 0–8186–7548–9/96, pp. 148–156.

Mencer, Oskar, et al., "PAM-Blox: High Performance FPGA Design for Adaptive Computing", © 1998 IEEE, Conference Paper, INSPEC Abstract Nos. B9811-1265B-044, C9811-5210-009.

Miyamori, Takashi, et al., "A quantitative analysis of reconfigurable coprocessors for multimedia applications", © 1998 IEEE, Conference Paper, INSPEC Abstract Nos. B9811-1265F-011, C9811-5310-010.

W.H. Mangione-Smith and B.L. Hutchings. Configurable computing: The Road Ahead. In Proceedings of the Reconfigurable Architectures Workshop (RAW'97), pp. 81-96, 1997.

Mirsky, Ethan A., "Coarse-Grain Reconfigurable Computing", Massachusetts Institute of Technology, Jun. 1996.

Vemuri, Ranga R. et al., "Configurable Computing: Technology and Applications", Apr. 2000, Computer, pp. 39-40.

DeHon, Andre, "The Density Advantage of Configurable Computing", Apr. 2000, Computer, pp. 41-49.

Haynes, Simon D. et al., "Video Image Processing with the Sonic Architecture", Apr. 2000, Computer, pp. 50-57.

Platzner, Marco, "Reconfigurable Accelerators for Combinatorial Problems", Apr. 2000, Computer, pp. 58-60.

Callahan, Timothy J. et al., "The Garp Architecture and C Compiler", Apr. 2000, Computer, pp. 62-69.

Goldstein, Seth Copen et al., "PipeRench: A Reconfigurable Architecture and Compiler", Apr. 2000, Computer, pp. 70-76.

* cited by examiner

SYSTEM AND METHOD FOR ACCELERATING WEB SITE ACCESS AND PROCESSING UTILIZING A COMPUTER SYSTEM INCORPORATING RECONFIGURABLE PROCESSORS OPERATING UNDER A SINGLE OPERATING SYSTEM IMAGE

CROSS REFERENCE TO RELATED PATENT APPLICATIONS

The present invention is a continuation-in-part application of U.S. patent application Ser. No. 09/563,561 filed May 3, 2000, now issued U.S. Pat. No. 6,339,819 B1, which is a continuation-in-part application of U.S. patent application Ser. No. 09/481,902 filed Jan. 12, 2000, now issued U.S. Pat. No. 6,247,110 which is a continuation of U.S. patent application Ser. No. 08/992,763 filed Dec. 17, 1997 for: "Multiprocessor Computer Architecture Incorporating a Plurality of Memory Algorithm Processors in the Memory Subsystem", now issued U.S. Pat. No. 6,076,152 assigned to SRC Computers, Inc., Colorado Springs, Colo., assignee of the present invention, the disclosures of which are herein specifically incorporated by this reference.

BACKGROUND OF THE INVENTION

The present invention relates, in general, to the field of computer architectures incorporating multiple processing elements such as multi-adaptive processors ("MAP™", is a trademark of SRC Computers, Inc., Colorado Springs, Colo.). More particularly, the present invention relates to systems and methods for accelerating web site access and processing utilizing a computer system incorporating reconfigurable processors operating under a single operating system image.

Presently, many different forms of electronic business and commerce are transacted by means of individual computers coupled to the Internet. By virtue of its computer-based nature, many electronic commerce ("e-commerce") web sites employ various methods to allow their content to be varied based on the demographics of the particular user.

This demographic information may be obtained in a variety of ways, with some sites simply requesting the site visitor respond to one or more questions while others may employ more sophisticated techniques such as "click stream" processing. In this latter instance, the prospective interests of the site visitor are inferred by determination and analysis of, for example, the previous sites he has visited. In either instance however, this data must be processed by the site such that the web page content may be altered in an effort to maximize it appeal to that particular site visitor with a view toward ultimately maximizing site revenue.

Since studies have shown that the average Internet user will wait but a maximum of twenty seconds or so for a web page to be updated, it is vitally important that the updating of the page contents be completed as rapidly as possible. Consequently, a great deal of effort is placed into maximizing the software performance of algorithms that process the user demographic data. Currently, all known web servers that accomplish this processing employ industry standard microprocessor based servers and, as a result, their maximum performance is thereby limited by the limitations inherent in the standard microprocessor "load/store" architecture.

SUMMARY OF THE INVENTION

SRC Computers, Inc., assignee of the present invention, is an industry leader in the design and development of multi-processor computer systems including those employing industry standard processors together with multi-adaptive processors ("MAP™") utilizing, for example, field programmable gate arrays functioning as the programmable MAP elements.

Particularly disclosed herein is a system and method for accelerating web site access and processing utilizing a multiprocessor computer system incorporating one or more microprocessors and a number of reconfigurable processors operating under a single operating system image. In an exemplary embodiment, a web site may be serviced with a hybrid multiprocessor computer system that contains both industry standard microprocessors and one or more reconfigurable processors that share all the system's resources and operate under a single operating system image, (although, in an alternative embodiment, cluster management software may be used to make a cluster of microprocessors appear to the user as a single copy of the operating system). In such a system, demographic data processing algorithms may be loaded into the reconfigurable processors which may be provided in the form of specially adapted field programmable gate arrays ("FPGAs"). In this manner, the appropriate algorithm may be implemented in hardware gates (as opposed to software) which can process the data up to 1000 times faster than a standard microprocessor based server.

As an exemplary implementation, one particularly efficacious hybrid computing system is the SRC Computers, Inc. SRC-6 incorporating multi-adaptive processors (MAP). In such a system, the algorithms loaded into the MAP elements to process the data can be completely changed in under 100 msec. This allows for the possibility of quickly altering even the processing algorithm without significantly delaying the site visitor. The ability to change the algorithm, coupled with highly accelerated processing times allows for more complex algorithms to be employed leading to even more refined web page content adjustment.

Through the use of such a hybrid system operating under a single operating system image, a standard operating system, such as Solaris™ (trademark of Sun Microsystems, Inc., Palo Alto, Calif.) may be employed and can be easily administered, a feature which is important in such e-commerce based applications. Since the MAP elements are inherently tightly-coupled into the system and are not an attached processor located, for example, on an input/output ("I/O") port, their effectiveness and ease of use is maximized.

Demographic data processing is merely an example of how the unique capabilities of such reconfigurable processing systems can be utilized to accelerate e-commerce, and "secure socket" operation is yet another possible application. In this instance, such operations can often consume as much as 80% of the typical, traditional site server microprocessor cycles. SRC Computers, Inc. has demonstrated that reconfigurable processor based systems, such as the SRC-6, can perform decryption algorithms up to 1000 times faster than a conventional microprocessor thereby also allowing for faster web site access while concomitantly allowing more robust data encryption techniques to be employed. Similarly significant speed advantages could be realized in, for example, implementing database searches wherein the search algorithms can be directly implemented in the hardware of the reconfigurable system providing two to three orders of magnitude execution time improvements over conventional microprocessor based solutions.

In general, the use of hybrid computer systems with a single system image of the operating system for web site hosting allows the site to employ user selected hardware accelerated versions of software algorithms currently implemented in a wide array of e-commerce related functions. This results in an easy to use system with significantly faster processing capability which translates into shorter site visitor waiting periods.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
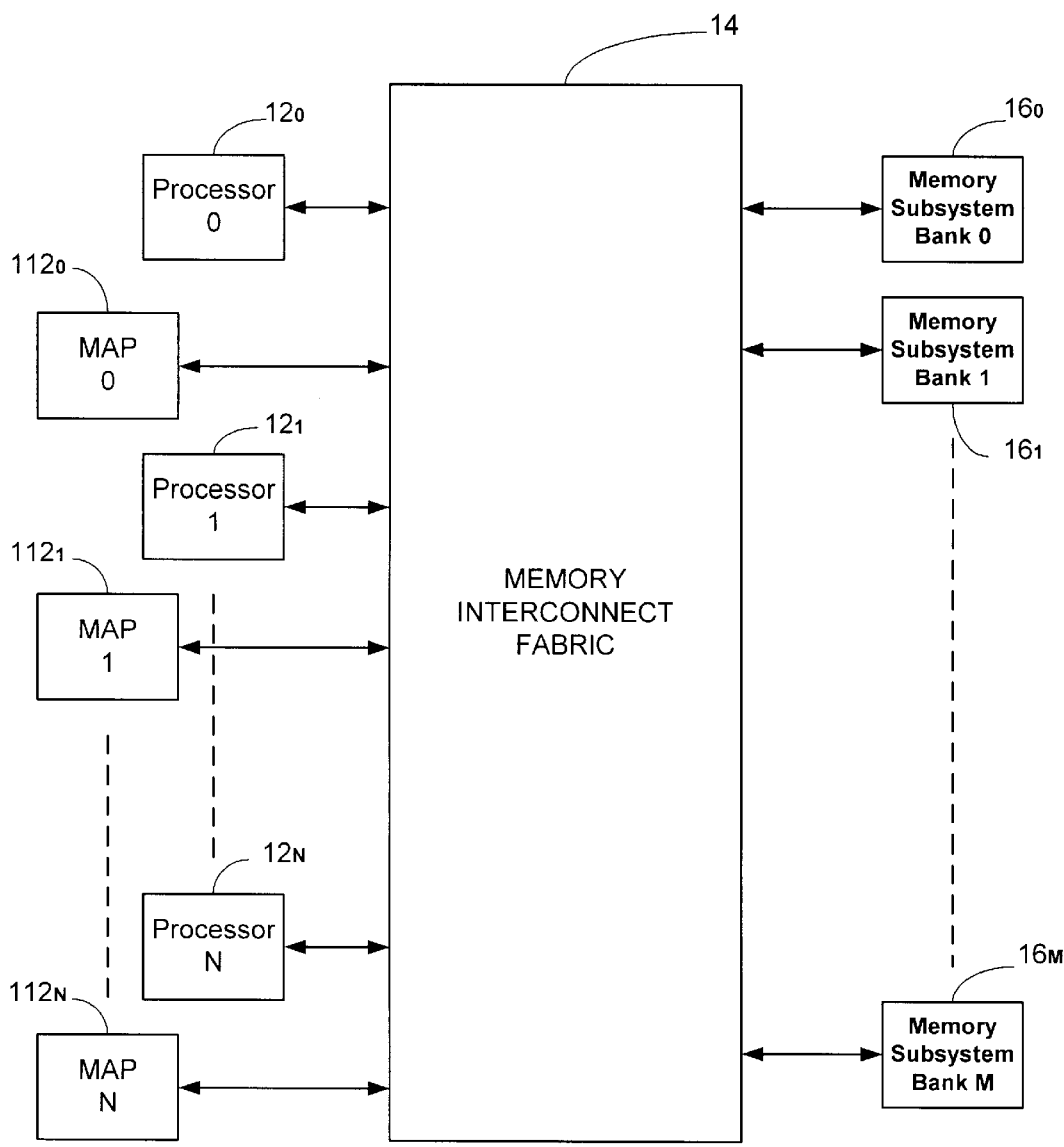
FIG. 1 is a simplified, high level, functional block diagram of a multiprocessor computer architecture employing multi-adaptive processors ("MAP™") in accordance with the disclosure of the aforementioned patent applications in an alternative embodiment wherein direct memory access ("DMA") techniques may be utilized to send commands to the MAP elements in addition to data.

With reference now to FIG. 1, a multiprocessor computer 10 architecture in accordance with one embodiment of the present invention is shown. The multiprocessor computer 10 incorporates N processors $12_0$ through $12_N$ which are bi-directionally coupled to a memory interconnect fabric 14. The memory interconnect fabric 14 is then also coupled to M memory banks comprising memory bank subsystems $16_0$ (Bank 0) through 16M (Bank M). N number of multi-adaptive processors ("MAP™") $112_0$ through $112_N$ are also coupled to the memory interconnect fabric 14 as will be more fully described hereinafter.

Figure 2:
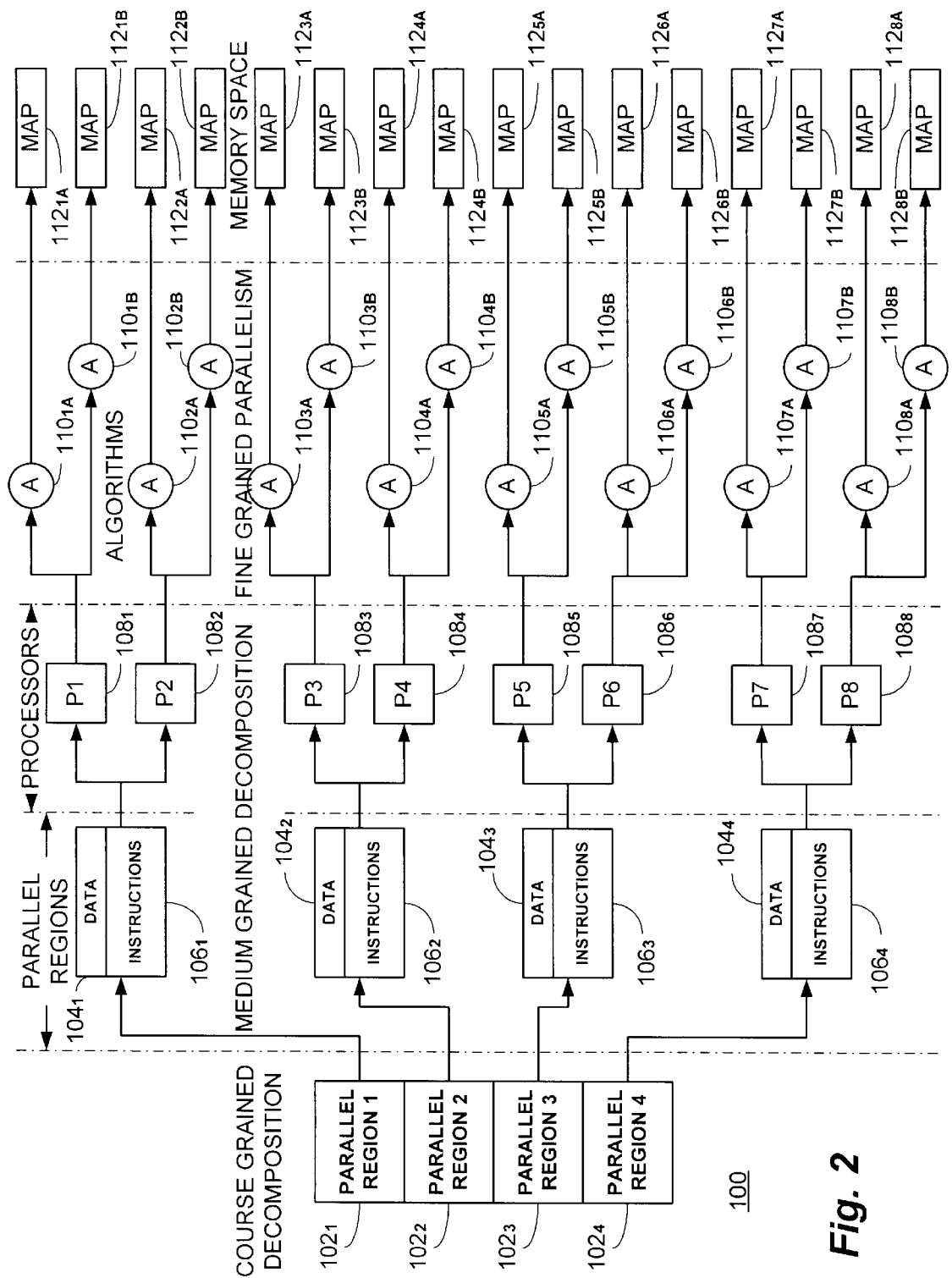
FIG. 2 is a simplified logical block diagram of a possible computer application program decomposition sequence for use in conjunction with a multiprocessor computer architecture utilizing a number of MAP elements located, for example, in the computer system memory space, in accordance with a particular embodiment of the present invention.

With reference now to FIG. 2, a representative application program decomposition for a multiprocessor computer architecture 100 incorporating a plurality of multi-adaptive processors in accordance with the present invention is shown. The computer architecture 100 is operative in response to user instructions and data which, in a coarse grained portion of the decomposition, are selectively directed to one of (for purposes of example only) four parallel regions $102_1$ through $102_4$ inclusive. The instructions and data output from each of the parallel regions $102_1$ through $102_4$ are respectively input to parallel regions segregated into data areas $104_1$ through $104_4$ and instruction areas $106_1$ through $106_4$. Data maintained in the data areas $104_1$ through $104_4$ and instructions maintained in the instruction areas $106_1$ through $106_4$ are then supplied to, for example, corresponding pairs of processors $108_1$, $108_2$ (P1 and P2); $108_3$, $108_4$ (P3 and P4); $108_5$, $108_6$ (P5 and P6); and $108_7$, $108_8$ (P7 and P8) as shown. At this point, the medium grained decomposition of the instructions and data has been accomplished.

A fine grained decomposition, or parallelism, is effectuated by a further algorithmic decomposition wherein the output of each of the processors $108_1$ through $108_8$, is broken up, for example, into a number of fundamental algorithms $110_{1A}$, $110_{1B}$, $110_{2A}$, $110_{2B}$ through $110_{8B}$ as shown. Each of the algorithms is then supplied to a corresponding one of the MAP elements $112_{1A}$, $112_{1B}$, $112_{2A}$, $112_{2B}$, through $112_{8B}$ which may be located in the memory space of the computer architecture 100 for execution therein as will be more fully described hereinafter.

Figure 3:
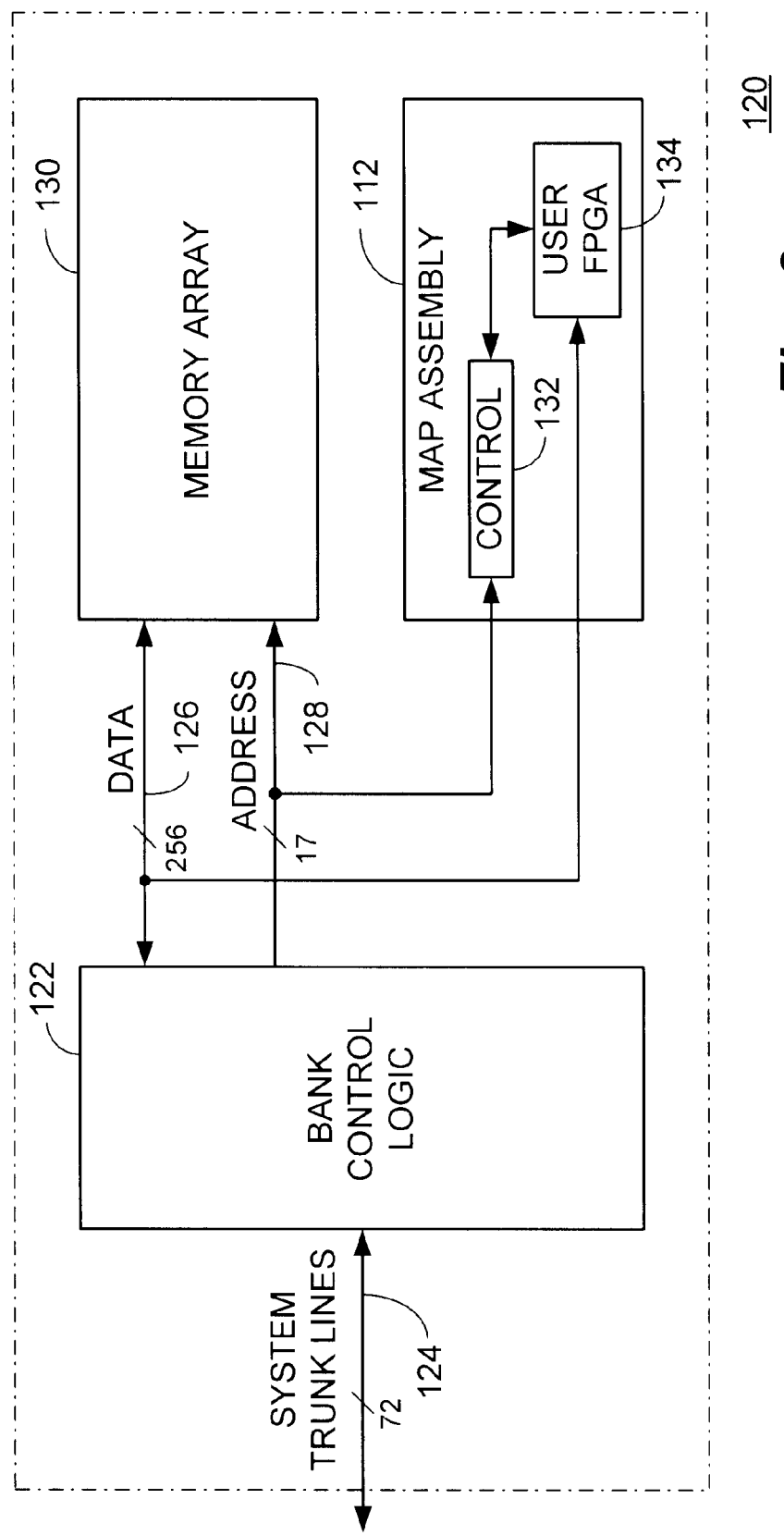
FIG. 3 is a more detailed functional block diagram of an exemplary individual one of the MAP elements of the preceding figures and illustrating the bank control logic, memory array and MAP assembly thereof.

With reference additionally now to FIG. 3, an exemplary implementation of a memory bank 120 in a MAP system computer architecture 100 of the present invention is shown for a representative one of the MAP elements 112 illustrated in the preceding figure. Each memory bank 120 includes a bank control logic block 122 bi-directionally coupled to the computer system trunk lines, for example, a 72 line bus 124. The bank control logic block 122 is coupled to a bi-directional data bus 126 (for example 256 lines) and supplies addresses on an address bus 128 (for example 17 lines) for accessing data at specified locations within a memory array 130.

The data bus 126 and address bus 128 are also coupled to a MAP element 112. The MAP element 112 comprises a control block 132 coupled to the address bus 128. The control block 132 is also bi-directionally coupled to a user field programmable gate array ("FPGA") 134 by means of a number of signal lines 136. The user FPGA 134 is coupled directly to the data bus 126. In a particular embodiment, the FPGA 134 may be provided as a Lucent Technologies OR3T80 device.

The computer architecture 100 comprises a multiprocessor system employing uniform memory access across common shared memory with one or more MAP elements 112 which may be located in the memory subsystem, or memory space. As previously described, each MAP element 112 contains at least one relatively large FPGA 134 that is used as a reconfigurable functional unit. In addition, a control block 132 and a preprogrammed or dynamically programmable configuration ROM (as will be more fully described hereinafter) contains the information needed by the reconfigurable MAP element 112 to enable it to perform a specific algorithm. It is also possible for the user to directly download a new configuration into the FPGA 134 under program control, although in some instances this may consume a number of memory accesses and might result in an overall decrease in system performance if the algorithm was short-lived.

FPGAs have particular advantages in the application shown for several reasons. First, commercially available FPGAs now contain sufficient internal logic cells to perform meaningful computational functions. Secondly, they can operate at speeds comparable to microprocessors, which eliminates the need for speed matching buffers. Still further, the internal programmable routing resources of FPGAs are now extensive enough that meaningful algorithms can now be programmed without the need to reassign the locations of the input/output ("1/0") pins.

By, for example, placing the MAP element 112 in the memory subsystem or memory space, it can be readily accessed through the use of memory read and write commands, which allows the use of a variety of standard operating systems. In contrast, other conventional implementations-may propose placement of any reconfigurable logic in or near the processor, however these conventional implementations are generally much less effective in a multiprocessor environment because, unlike the system and method of the present invention, only one processor has rapid access to it. Consequently, reconfigurable logic must be placed by every processor in a multiprocessor system, which increases the overall system cost. In addition, MAP element 112 can access the memory array 130 itself, referred to as Direct Memory Access ("DMA"), allowing it to execute tasks independently and asynchronously of the processor. In comparison, were it placed near the processor, it would have to compete with the processors for system routing resources in order to access memory, which deleteriously impacts processor performance. Because MAP element 112 has DMA capability, (allowing it to write to memory), and because it receives its operands via writes to memory, it is possible to allow a MAP element 112 to feed results to another MAP element 112. This is a very powerful feature that allows for very extensive pipelining and parallelizing of large tasks, which permits them to complete faster.

Many of the algorithms that may be implemented will receive an operand and require many clock cycles to produce a result. One such example may be a multiplication that takes 64 clock cycles. This same multiplication may also need to be performed on thousands of operands. In this situation, the incoming operands would be presented sequentially so that while the first operand requires 64 clock cycles to produce results at the output, the second operand, arriving one clock cycle later at the input, will show results one clock cycle later at the output. Thus, after an initial delay of 64 clock cycles, new output data will appear on every consecutive clock cycle until the results of the last operand appears. This is called "pipelining".

In a multiprocessor system, it is quite common for the operating system to stop a processor in the middle of a task, reassign it to a higher priority task, and then return it, or another, to complete the initial task. When this is combined with a pipelined algorithm, a problem arises (if the processor stops issuing operands in the middle of a list and stops accepting results) with respect to operands already issued but not yet through the pipeline. To handle this issue, a solution involving the combination of software and hardware is disclosed herein.

To make use of any type of conventional reconfigurable hardware, the programmer could embed the necessary commands in his application program code. The drawback to this approach is that a program would then have to be tailored to be specific to the MAP hardware. The system of the present invention eliminates this problem. Multiprocessor computers often use software called parallelizers. The purpose of this software is to analyze the user's application code and determine how best to split it up among the processors. The present invention provides significant advantages over a conventional parallelizer and enables it to recognize portions of the user code that represent algorithms that exist in MAP elements 112 for that system and to then treat the MAP element 112 as another computing element. The parallelizer then automatically generates the necessary code to utilize the MAP element 112. This allows the user to write the algorithm directly in his code, allowing it to be more portable and reducing the knowledge of the system hardware that he has to have to utilize the MAP element 112.

Figure 4:
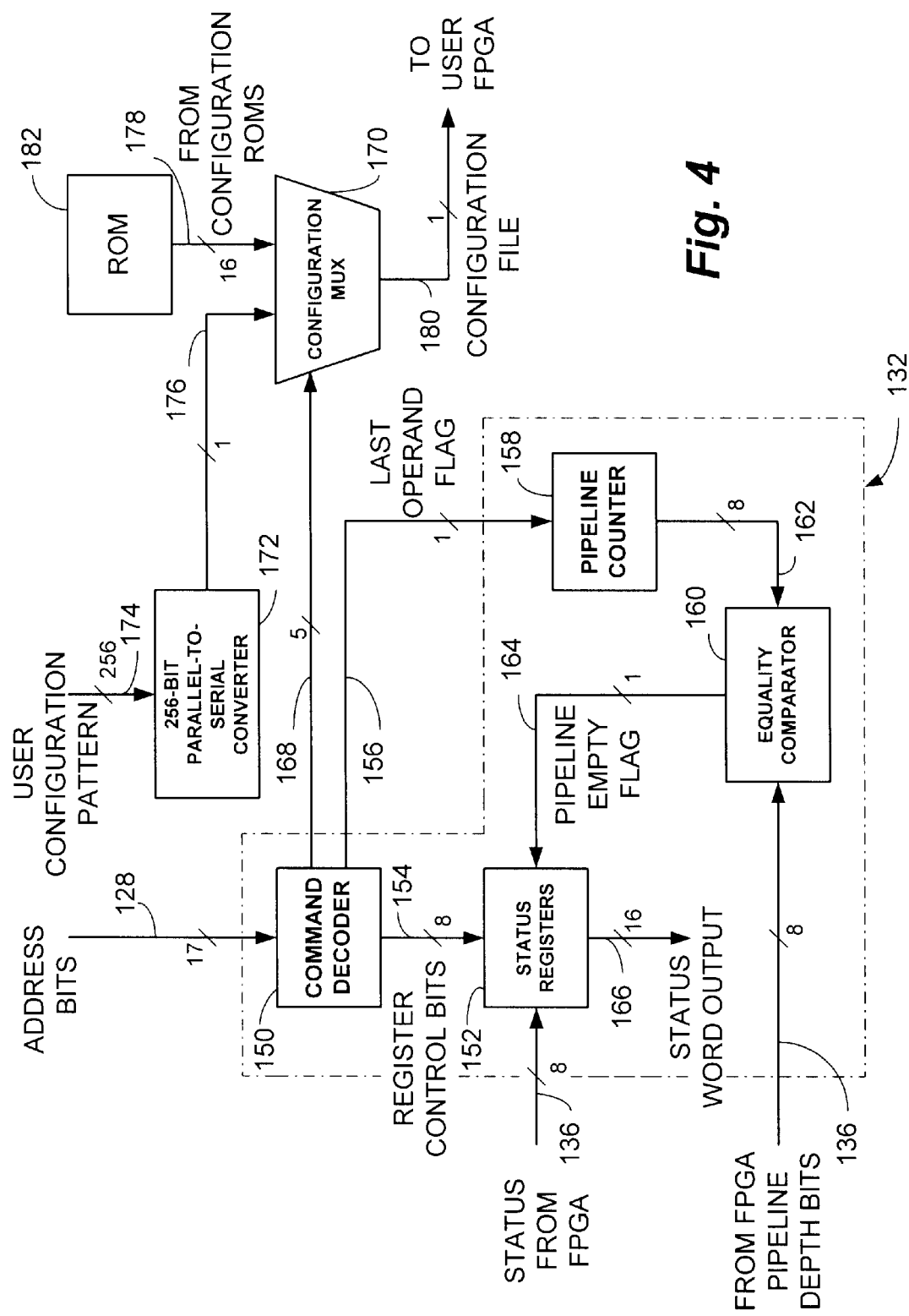
FIG. 4 is a more detailed functional block diagram of the control block of the MAP assembly of the preceding illustration illustrating its interconnection to the user FPGA thereof in a particular embodiment.

With reference additionally now to FIG. 4, a block diagram of the MAP control block 132 is shown in greater detail. The control block 132 is coupled to receive a number of command bits (for example, 17) from the address bus 128 at a command decoder 150. The command decoder 150 then supplies a number of register-control bits to a group of status registers iS2 on an eight bit bus 154. The command decoder 150 also supplies a single bit last operand flag on line 156 to a pipeline counter 158. The pipeline counter 158 supplies an eight bit output to an equality comparitor 160 on bus 162. The equality comparitor 160 also receives an eight bit signal from the FPGA 134 on bus 136 indicative of the pipeline depth. When the equality comparitor 160 determines that the pipeline is empty, it provides a single bit pipeline empty flag on line 164 for input to the status registers 152. The status registers 152 are also coupled to receive an eight bit status signal from the FPGA 134 on bus 136and it produces a sixty four bit status word output on bus 166 in response to the signals on bus 136, 154 and line 164.

The command decoder 150 also supplies a five bit control signal on line 168 to a configuration multiplexer ("MUX") 170 as shown. The configuration MUX 170 receives a single bit output of a 256 bit parallel-serial converter 172 on line 176. The inputs of the 256 bit parallel-to-serial converter 172 are coupled to a 256 bit user configuration pattern bus 174. The configuration MUX 170 also receives sixteen single bit inputs from the configuration ROMs (illustrated as ROM 182) on bus 178 and provides a single bit configuration file signal on line 180 to the user FPGA 134 as selected by the control signals from the command decoder 150 on the bus 168.

In operation, when a processor 108 is halted by the operating system, the operating system will issue a last operand command to the MAP element 112 through the use of command bits embedded in the address field on bus 128. This command is recognized by the command decoder 150 of the control block 132 and it initiates a hardware pipeline counter 158. When the algorithm was initially loaded into the FPGA 134, several output bits connected to the control block 132 were configured to display a binary representation of the number of clock cycles required to get through its pipeline (i.e. pipeline "depth") on bus 136 input to the equality comparitor 160. After receiving the last operand command, the pipeline counter 158 in the control block 132 counts clock cycles until its count equals the pipeline depth for that particular. algorithm. At that point, the equality comparitor 160 in the control block 132 de-asserts a busy bit on line 164 in an internal group of status registers 152. After issuing the last operand signal, the processor 108 will repeatedly read the status registers 152 and accept any output data on bus 166. When the busy flag is de-asserted, the task can be stopped and the MAP element 112 utilized for a different task. It should be noted that it is also possible to leave the MAP element 112 configured, transfer the program to a different processor 108 and restart the task where it left off.

In order to evaluate the effectiveness of the use of the MAP element 112 in a given application, some form of feedback to the use is required. Therefore, the MAP element 112 may be equipped with internal registers in the control block 132 that allow it to monitor efficiency related factors such as the number of input operands versus output data, the number of idle cycles over time and the number of system monitor interrupts received over time. One of the advantages that the MAP element 112 has is that because of its reconfigurable nature, the actual function and type of function that are monitored can also change as the algorithm changes. This provides the user with an almost infinite number of possible monitored factors without having to monitor all factors all of the time.

Figure 5:
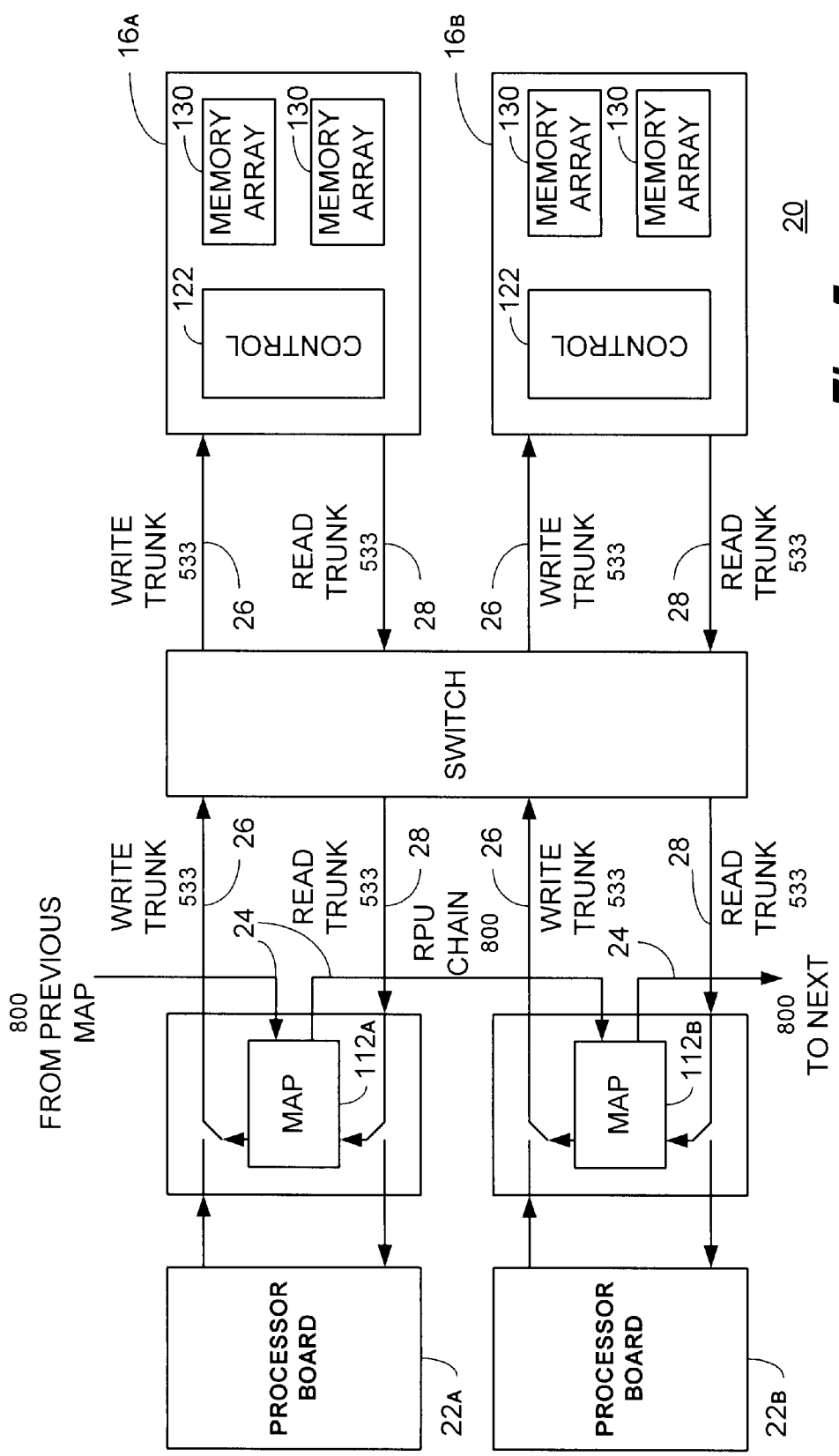
FIG. 5 is a functional block diagram of an alternative embodiment of the present invention wherein individual MAP elements are closely associated with individual processor boards and each of the MAP elements comprises independent chain ports for coupling the MAP elements directly to each other.

With reference additionally now to FIG. 5, a functional block diagram of a portion of an alternative embodiment of a computer system 20 in accordance with the of the present invention is shown. In the computer system 20 illustrated, individual MAP elements $112_A$, $112_B$ etc. are each closely associated with individual processor boards $22_A$, $22_B$ respectively. As depicted, each of the MAP elements 112 comprises independent chain ports 24 for coupling the MAP elements 112 directly to each other.

Individual ones of the MAP elements 112 are coupled between the processor board 22 write trunk 26 and read trunk 28 of each processor board 22 in addition to their coupling to each other by means of the chain ports 24. A switch couples the write trunk 26 and read trunk 28 of any given processor board to any other memory subsystem bank $16_A$, $16_B$ etc. As generally illustrated, each of the memory subsystem banks 16 includes a control-block 122 and one or more memory arrays 130.

Figure 6:
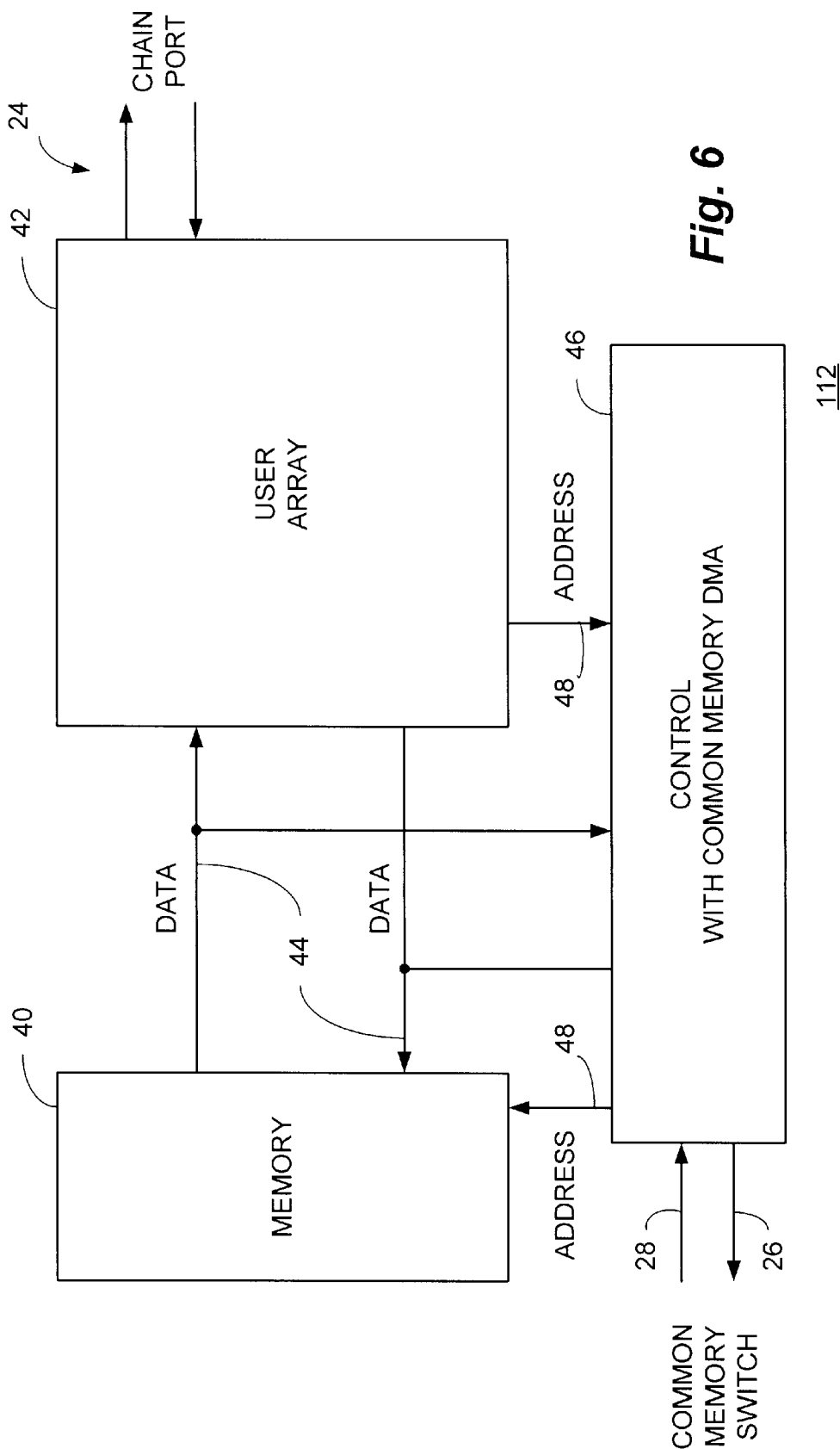
FIG. 6 is a functional block diagram of an individual MAP element wherein each comprises on board memory and a control block providing common memory DMA capabilities.

With reference additionally now to FIG. 6, a functional block diagram of an individual MAP element 112 is shown wherein each MAP element 112 comprises an on board memory 40 and a control block 46 providing common memory DMA capabilities. Briefly, the write trunk 26 and read trunk 28 are coupled to the control block 46 from the common memory switch which provides addresses to the memory 40 and receives addresses from the user array 42 on address lines 48. Data supplied on the write trunk 26 is provided by the control block 46 to the memory 40 on data lines 44 and data read out of the memory 40 is provided on these same lines both to the user array 42 as well as the control block 46 for subsequent presentation on the read trunk 28. As indicated, the chain port 24 is coupled to the user array 42 for communication of read and write data directly with other MAP elements 112.

Figure 7:
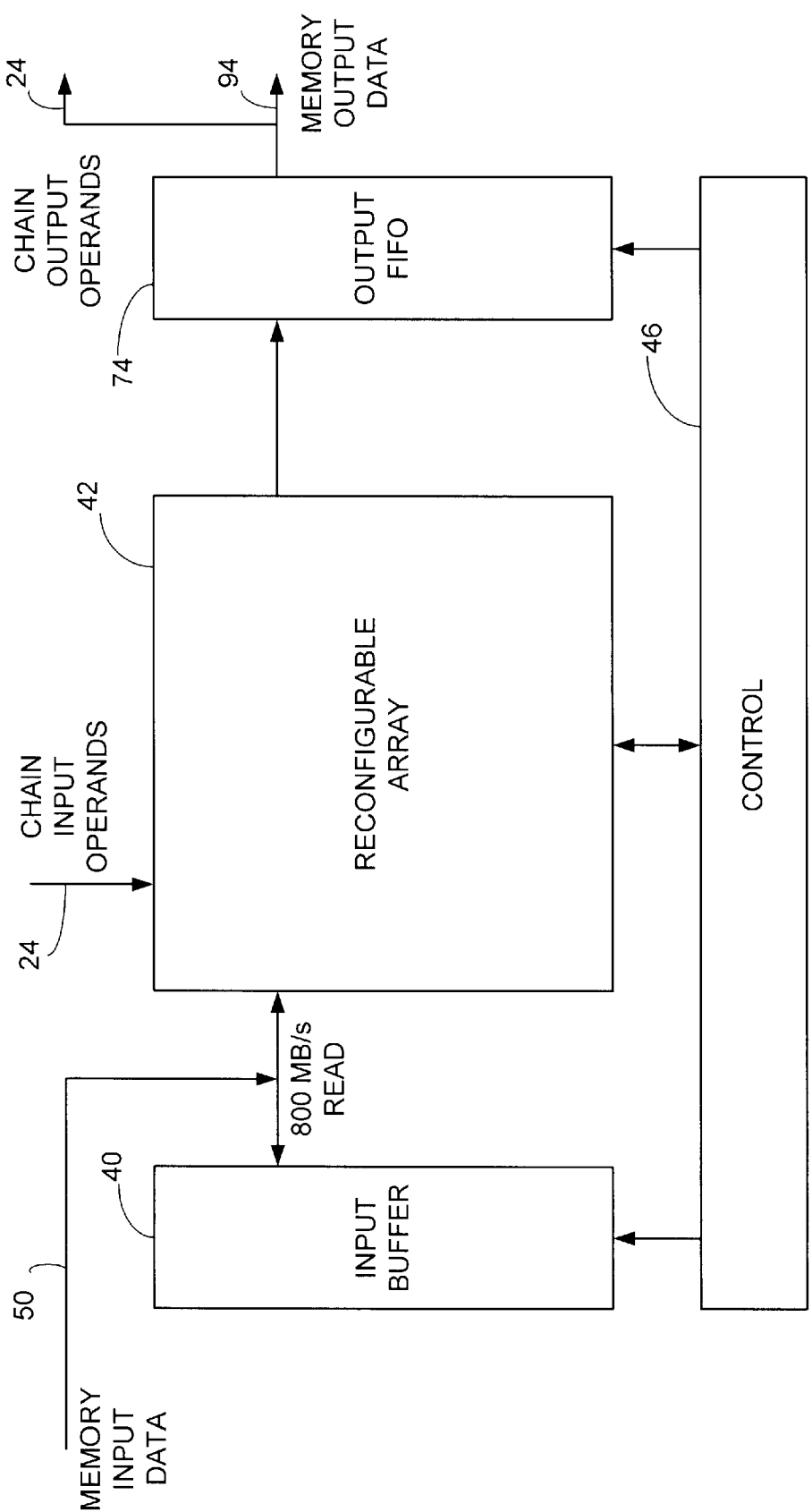
FIG. 7 is an additional functional block diagram of an individual MAP element illustrating the on board memory function as an input buffer and output FIFO portions thereof.

With reference additionally now to FIG. 7, an additional functional block diagram of an individual MAP element 112 is shown particularly illustrating the memory 40 of the preceding figure functioning as an input buffer 40 and output FIFO 74 portions thereof. In this figure, an alternative view of the MAP element 112 of FIG. 6 is shown in which memory input data on line 50 (or the write trunk 26) is supplied to an input buffer (memory 40) as well as to a reconfigurable user array 42 coupled to the chain port 24. The output of the reconfigurable array 42 is supplied to an output FIFO 74 to provide memory output data on line 94 (or the read trunk 28) as well as to the chain port 24. The input buffer 40, reconfigurable array 42 and output FIFO 74 operate under the control of the control block 46.

With respect to the foregoing figures, each MAP element 112 may consist of a printed circuit board containing input operand storage (i.e. the memory/input buffer 40), user array 42, intelligent address generator control block 46, output result storage FIFO 74 and I/O ports to allow connections to other MAP elements 112 through the chain port 24 as well as the host system memory array.

Input Operand Storage

The input storage consists of memory chips that are initially loaded by memory writes from one of the microprocessors 12 in the host system or by MAP DMA. The buffer 40 may be, in a particular embodiment, 72 bits wide and 2M entries deep. This allows for storage of 64 bit operands and 8 error correction code ("ECC") bits for data correction if needed. Operands or reference data can be read from this buffer 40 by the user array 42. Data is not corrupted after use allowing for operand reuse by the MAP elements 112. By reading operands only after the buffer 40 is loaded, operands do not need to arrive at the MAP elements 112 in time order. MAP elements 112 only require that store order be maintained thus allowing for out-of-order arrival of operands prior to storage in the input buffer 40. This means cache line transfers, which typically can not be performed in a timed order but have four times the bandwidth of un-cached transfers, can be used to load the input buffers 40.

Intelligent Address Generator

The input buffer 40 contents are accessed by providing address and read enable signals to it from the control block 46. These addresses may be generated in one of two ways. First the address bits can be provided by the programmable user array 42 to the address generator control block 46 where it is combined with other control signals and issued to the input buffer 40. This allows for very random access into the buffer 40 such as would be needed to access reference data. Another address mode requires the user to issue a start command which contains a start address, stop address, and stride. The address generator control block 46 will then start accessing the input buffer 40 at the start address and continue accessing it by adding the stride value to the last address sent until the stop address is reached. This is potentially a very useful technique when performing vector processing where like elements are extracted out of an array. Since the stride can be any number less than the delta between the start and stop addresses, it is very easy for the MAP element 112 to perform a data gather function which is highly valuable in the high performance computing market.

User Array

The array 42 performs the actual computational functions of the MAP element 112. It may comprise one or more high performance field programmable gate arrays ("FPGAs") interconnected to the other elements of the MAP element 112. A particular implementation of the present invention disclosed in more detail hereinafter, may use four such devices yielding in excess of 500,000 usable gates. These components are configured by user commands that load the contents of selected configuration ROMs into the FPGAs. After configuration, the user array 42 can perform whatever function it was programmed to do. In order to maximize its performance for vector processing, the array 42 should be able to access two streams of operands simultaneously. This is accomplished by connecting one 72 bit wide input port to the input operand storage and a second 72 bit wide port to the chain input connector port 24. This connector allows the MAP element 112 to use data provided to it by a previous MAP element 112. The chain port 24 allows functions to be implemented that would far exceed the capability of a single MAP element 112 assembly. In addition, since in the particular implementation shown, only operands are transferred over the chain port 24, the bandwidth may exceed the main memory bandwidth resulting in superior performance to that of the fixed instruction microprocessor-based processors 12.

The FPGAs may also contain on board phase locked loops ("PLLs") that allow the user to specify at what multiple or sub-multiple of the system clock frequency the circuit will run. This is important because certain complex functions may require clocks that are slower than the system clock frequency. It may also be that the user desires to synthesize a function resulting in lower performance but faster time to market. By using PLLs, both of these constraints can be accommodated. Another benefit in the potential utilization of a PLL is that future generation FPGAs that can operate faster than the current system clock speeds can be retrofitted into slower systems and use the PLL frequency multiplication feature to allow the MAP element 112 to run faster than the rest of the system. This is turn results in a higher performance MAP element 112.

Output Result Storage

When the user array 42 produces a result, it may be sent over a 72 bit wide path to an output result storage element (for example, output FIFO 74) which can then pass the data to either a 72 bit wide read port or a 72 bit wide chain port 24 to the next MAP element 112. This storage device can made from a number of different memory types. The use of a FIFO 74 storage device will temporarily hold results that cannot be immediately read by a host microprocessor or passed over the output chain port 24 to the next stage. This feature allows for MAP elements 112 in a chain to run at different frequencies. In this case the output FIFO 74 functions like a speed matching buffer. In non-chained operation, the microprocessor that is reading the results may be delayed. In this case the FIFO 74 prevents the MAP element 112 from "stalling" while waiting for results to be read. In a particular embodiment of the present invention, a FIFO 74 that is 72 bits wide and 512K entries deep may be utilized. As disclosed in the aforementioned patent applications, the output storage may also be a true memory device such as those found in common memory. In this case, write addresses must be provided by the user array 42 or address generator and read addresses provided by the entity reading the results from the memory. While this may be somewhat more electrically complicated, it has the advantage that results may be accessed in any order.

DMA Enhancements

In the aforementioned patent applications, the ability of MAP elements 112 to perform DMA to common memory was disclosed. While this capability was discussed primarily with respect to the movement of operands and results, it is also possible to apply the same concept to commands. The microprocessor that would normally write a series of commands directly to the MAP element 112 may also write the same commands into common memory as well. After writing a series of commands, the microprocessor could then send an interrupt to the MAP element 112. The MAP element 112 would then read the commands from common memory and execute them as contemplated. Since this command list could contain DMA instructions as specified in the previously mentioned patent applications, the MAP element 112 could retrieve all of its input operands and store all of its results without any further processor 12 intervention. At the completion of MAP element 112 processing, the MAP element 112 could then interrupt the microprocessor to signal that results are available in common memory. Operation in this manner reduces the interaction required between the MAP element 112 and the microprocessor.

On Board Library

As originally disclosed, electrically erasable programmable ROMs ("EEPROMs") or similar devices may be utilized to hold a library of functions for the user array 42. By placing these algorithms in ROMs on the MAP element 112 itself, the user array 42 function can be changed very rapidly. In this manner, the user program can download a new function into one of the on board ROMs thus updating its contents and allowing the MAP element 112 to perform new functions. In a particular implementation, this may be accomplished by reserving one of the library functions to perform the function of an EEPROM programmer. When a command to update a ROM is received, the user array 42 may be configured with this special function and data read from the MAP element 112 input storage (e.g. input buffer 40) and then loaded into the ROMs to complete the update process.

Figure 8:
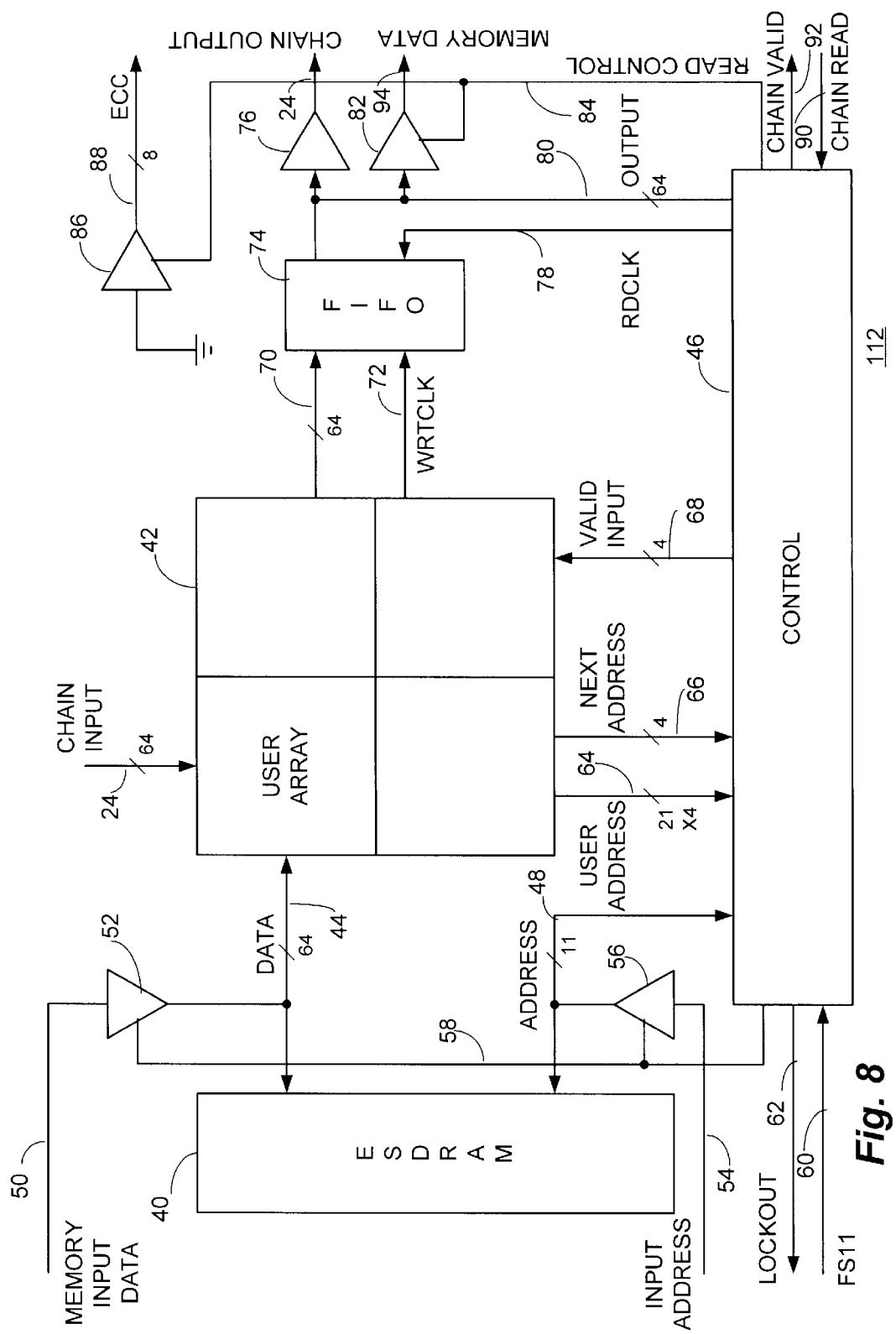
FIG. 8 is a more detailed functional block diagram of an individual MAP element as illustrated in FIGS. 6 and 7.

With reference additionally now to FIG. 8 a more detailed functional block diagram of an individual MAP element 112 is shown as previously illustrated in FIGS. 6 and 7. In this depiction, the MAP element 112 includes an enhanced synchronous dynamic random access memory (ESDRAM™, a trademark of Enhanced Memory Systems, Inc., Colorado Springs, Colo.) functioning as the memory, or input buffer 40. ESDRAM memory is a very high speed memory device incorporating a dynamic random access memory ("DRAM") array augmented with an on-chip static random access memory ("SRAM") row register to speed device read operations.

In this figure, like structure to that previously described is like numbered and the foregoing description thereof shall suffice herefor. Memory input data on lines 50 is supplied through transmission gates 52 to the data lines 44 for provision to the memory 40 and user array 42. In like manner, address input is received on lines 54 for provision through transmission gates 56 to the address lines 48 coupled to the memory 40 and control block 46. The control block 46 operatively controls the transmission gates 52, 56 and receives an FS11 signal on line 60 and provides a LOCKOUT signal on line 62.

The user array 42 may be coupled, as shown, to the chain port 24 and it provides a user address signal on lines 64 and a next address signal on lines 66 to the control block 46. The control block 46, provides an indication of whether or not an input is valid to the user array 42 on lines 68. Output of the user array 42 is provided on lines 70 together with a write clock ("WRTCLK") signal on line 72 to the FIFO 74 or other output storage device. The FIFO 74 receives a read clock ("RDCLK") signal on line 78 from the control block 46. Output from the FIFO 74 or control block 46 may be selectively supplied on lines 80 through transmission gates 76 to the chain port 24 and/or through transmission gates 82 to provide memory data on lines 94. The control block 46 also receives a chain read signal on lines 90 and returns a chain valid output on lines 92. The control block 46 operatively controls the transmission gates 76 and 82 in addition to transmission gates 86 which serve to provide error correction code ("ECC") output signals on lines 88.

As mentioned previously, the MAP elements 112 may comprise one or more circuit boards, utilizing, for example, one Lucent Orca™ OR3T80 FPGA to function as the control block 46 and, four OR3T125 FPGAs forming the user array 42. The user can implement algorithms in these FPGAs that alter data that is written to it and provide this altered data when the MAP element 112 is then read. In addition, each MAP element 112 may also comprise eight sets of four configuration ROMs on board. These ROMs are preprogrammed by the user and configure the four user FPGAs of the user array 42 under program control. These ROMs may be reprogrammed either externally or while on the MAP element 112 located in a system.

The MAP elements 112 are accessed through the use of normal memory READ and WRITE commands. In the representative embodiment illustrated and described, the user can provide operands to the MAP elements 112 either by directly writing 128-bit packets (i.e. in the form of two 64-bit words) into the user array 42 chips or by writing 256-bit packets (in the form of our 64-bit words) into a dedicated 16-MB ESDRAM memory input data buffer 40. A read from a MAP element 112 always returns a 2-word packet and part of this returned packet contains status information as will be more fully described hereinafter. In addition, the incoming addresses are decoded into commands as will also be defined later.

MAP elements 112 also have the ability to be chained via hardware. This allows the output data from one MAP element 112 to move directly to the user array 42 chips of the next MAP element 112 without processor 12 intervention. Chain length is limited by the quantity of MAP elements 112 in the overall system. The total number of MAP elements 112 may also be broken down into several smaller independent chains. In a chained mode of operation, a MAP element 112 can still read from its input buffer 40 to access reference information such as reciprocal approximation tables.

Logic Conventions

In the representative implementation of the computer system of the present invention disclosed herein, the processors 12 may comprise Pentium™ (a trademark of Intel Corporation, Santa Clara, Calif.) processors and these devices utilize an active "low" logic convention which applies to all address bits and data words transmitted to or from the MAP elements 112 including the returned status word.

Figure 9:
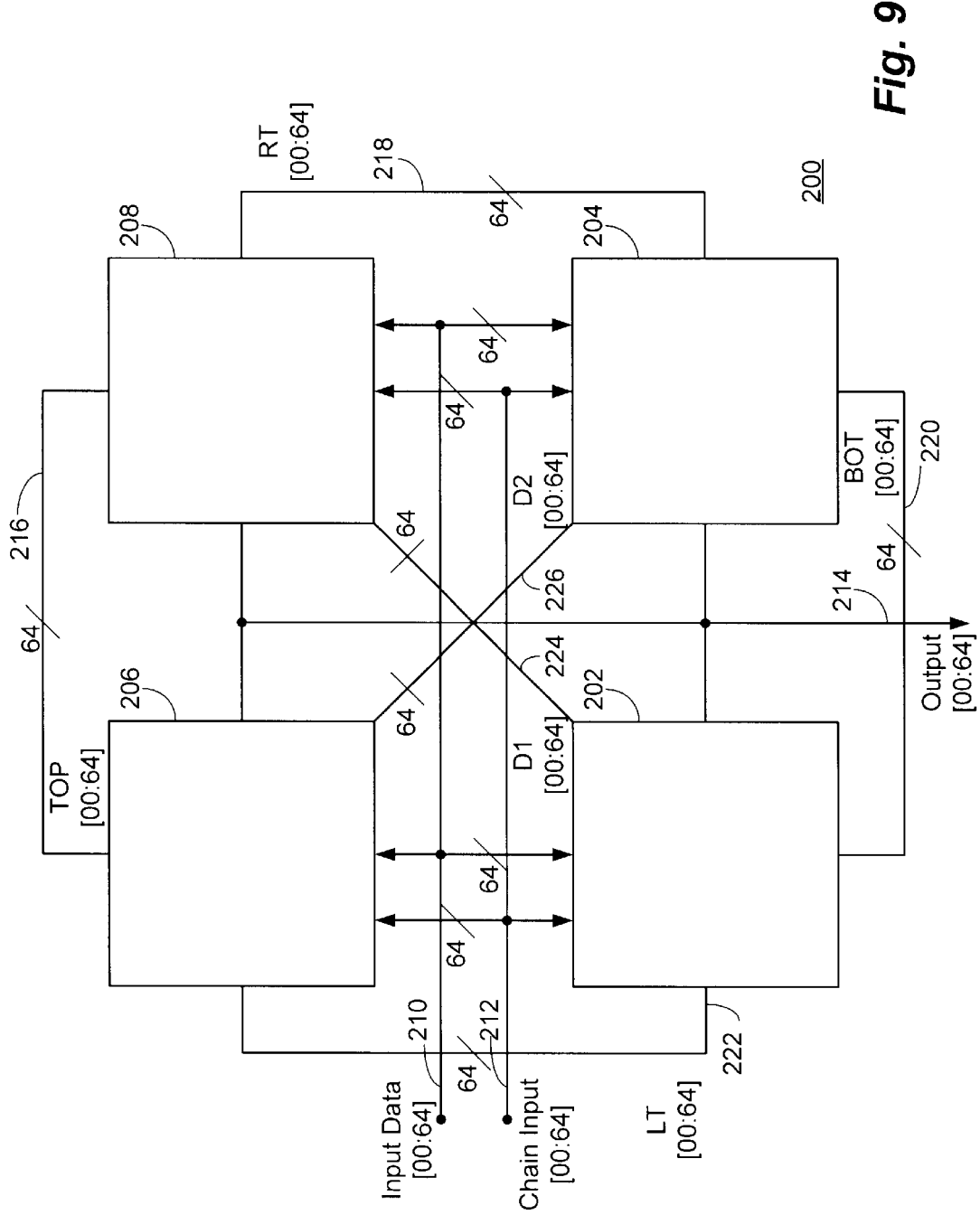
FIG. 9 is a user array interconnect diagram illustrating, for example, four user FPGAs interconnected through horizontal, vertical and diagonal buses to allow for expansion in designs that exceed the capacity of a single FPGA.

With reference additionally now to FIG. 9, a user array interconnect 200 diagram is shown, for example, utilizing four user FPGAs interconnected through horizontal, vertical and diagonal buses to allow for expansion in designs that might exceed the capacity of a single FPGA. In this regard, the interconnect diagram 200 corresponds to the user array 42 of the preceding figures with input data bus 210 corresponding to the data lines 44, the chain input bus 212 corresponding to the chain port 24 and the output bus 214 corresponding to the lines 70 of FIG. 8. The four FPGAs 202, 204, 206 and 208 comprising the user array 42 are each coupled to the input data bus 210, chain input bus 212 and output bus 214 as well as to each other by means of top bus 216, right bus 218, bottom bus 220, left bus 222 and diagonal buses 224 and 226.

User Array Interconnect

As previously described, the four user FPGAs (202, 204, 206 and 208) are interconnected through a series of horizontal, vertical, and diagonal buses which allow the easiest expansion of the existing symmetric internal chip routing for designs that exceed the capacity of a single FPGA for the user array 42. In the exemplary illustration shown, bus sizes were chosen to utilize as many pins as possible while maintaining a bus width of at least 64 bits.

Address Structure

Because MAP may be located in the memory array of the system and decodes a portion of the address field, the address generated by the processor 12 must be correctly assembled. The following Table 1 shows the address bit allocation as seen by the processor 12 and the MAP element 112 board. The processor board bridge elements will reallocate the bit positions that are actually transmitted to the MAP element 112 based on system size.

Field Select Bits

The Field Select bits are the two most significant address bits leaving the bridge elements and are used to select which of the four possible mezzanine cards in the memory stack is being accessed. The Field Select bits for all mezzanine cards are determined by the state of P6 bus bits A[21:20]. If bit A21 is set, a MAP element 112 operation is underway and the Field Select bits are set to 11. The MAP element 112 is always located just above the semaphore registers with the first MAP element 112 in segment 0 bank 0, the second in segment 1 bank 0 and so on until one MAP element 112 is each segment's bank 0. They are then placed in segment 0 bank 1 and the same pattern is followed until all are placed. This keeps them in a continuous address block.

Chip Select Bits

The next 3 most significant bits are Chip Select bits. These normally select which one of the eight rows of memory chips on a mezzanine board are activated. For MAP elements 112, Chip Selects 0 and 1 are used. Chip Select 0 is used to write to the ESDRAM memory input buffer 40 and Chip Select 1 is used to access the control block 46 and user chips of the user array 42.

Memory Address Bits

The next 19 most significant bits on the P6 bus are Memory Address bits that normally select the actual location within the memory chip of the cache line in use. Five of these bits are decoded by the MAP element 112 into various commands that are discussed in greater detail hereinafter.

Bank Select Bits

The next 4 most significant bits are the Bank Select bits. These bits are used to select the specific bank within a segment in which the desired memory or MAP element 112 is located.

Trunk Select Bits

The next 4 most significant bits are the Trunk Select bits. The number of these bits range from 0 to 4 depending upon the number of segments in the system. These bits are used to select the segment that contains the desired memory or MAP. Unused bits are set to 0.

TABLE 1

P6 to Packet Bit Translation

| Address | P6 Bus | Packet Bit | Bridge Output |
|---|---|---|---|
| 0 | 0 | | |
| 1 | 0 | | |
| 2 | 0 | | |
| 3 | Cmd 0 | 13 | Cmd 0 |
| 4 | Cmd 1 | 14 | Cmd 1 |
| 5 | 0 | 15 | Map Sel 4 |
| 6 | 0 | 19 | Map Sel 0 |
| 7 | 0 | 20 | Map Sel 1 |
| 8 | 0 | 21 | Map Sel 2 |
| 9 | 0 | 22 | Map Sel 3 |
| 10 | Cmd 2 | 23 | Cmd 2 |
| 11 | Cmd 3 | 24 | Cmd 3 |
| 12 | Sel 0 | 25 | Sel 0 |
| 13 | Sel 1 | 26 | Sel 1 |
| 14 | Sel 2 | 27 | Sel 2 |
| 15 | 0 | 28 | 0 |
| 16 | Map Sel 0 | 29 | 0 |
| 17 | Map Sel 1 | 30 | 0 |
| 18 | Map Sel 2 | 31 | 0 |
| 19 | Map Sel 3 | 32 | 0 |
| 20 | Map Sel 4 | 33 | 0 |
| 21 | 1 | 34 | 0 |
| 22 | 0 | 35 | 0 |
| 23 | 0 | 36 | 0 |
| 24 | 0 | 37 | 0 |
| 25 | 0 | 38 | 0 |
| 26 | 0 | 39 | 0 |
| 27 | 0 | 40 | 0 |
| 28 | 0 | 41 | 0 |
| 29 | 0 | 42 | Chip Sel 0 |
| 30 | 0 | 43 | Chip Sel 1 |
| 31 | 0 | 44 | Chip Sel 2 |
| 32 | 0 | 45 | 1 |
| 33 | 0 | 46 | 1 |
| 34 | 0 | | |
| 35 | 0 | | |

Word Select Bits

The next 2 most significant bits are the Word Select bits. These bits determine the order in which each word of a 4-word cache line is being used. With CS[1:0] set to 01, these bits are part of the decoded command.

MAP Command Decode

CMD[3:0] are decoded into the following commands by the MAP control block 46 chip when CS[1:0] are 01 as shown in the following Table 2. This decode is also dependent upon the transaction being either a READ or WRITE. In addition, SEL[2:0] are used in conjunction with the RECON and LDROM commands described hereinafter to select which one of the eight ROM'S to be used.

TABLE 2

Address Bit Command Decode

| CMD [3:0] | | | | Read/Write | Command | Basic Function |
|---|---|---|---|---|---|---|
| 3 | 2 | 1 | 0 | | | |
| 1 | 1 | 1 | 1 | Write | Null | MAP operation continues as before this was received. |
| 1 | 1 | 1 | 0 | Write | RMB | Resets MAP Board user chips and reconfigures control chips. |
| 1 | 1 | 0 | 1 | Write | RUC | Resets User and control chip latches |
| 1 | 1 | 0 | 0 | Write | RECON | RECONfigures user circuits. Used with SEL[2:0]. |
| 1 | 0 | 1 | 1 | Write | LASTOP | LAST OPerand is being written. |
| 1 | 0 | 1 | 0 | Write | WRTOP | WRiTe OPerand to user circuit. |
| 1 | 0 | 0 | 1 | Write | DONE | Processor is DONE with MAP clears busy flag. |
| 1 | 0 | 0 | 0 | Write | LDROM | Loads a new algorithm from input buffer into the ROM selected by SEL[2:0]. |
| 0 | 1 | 1 | 1 | Write | START | Sends start address. stop address. auto/user. and stride to input control chip starting MAP operation. |
| 0 | 1 | 1 | 0 | Write | Future | Reserved. |
| 0 | 1 | 0 | 1 | Write | Future | Reserved. |
| 0 | 1 | 0 | 0 | Write | Future | Reserved. |
| 0 | 0 | 1 | 1 | Write | Future | Reserved. |
| 0 | 0 | 1 | 0 | Write | Future | Reserved. |
| 0 | 0 | 0 | 1 | Write | Future | Reserved. |
| 0 | 0 | 0 | 0 | Write | Future | Reserved. |
| 1 | 1 | 1 | 1 | Read | Null | MAP operation continues as before this was received. |
| 1 | 1 | 1 | 0 | Read | RDSTAT | Reads status word |
| 1 | 1 | 0 | 1 | Read | RDDAT | Reads 2 data words |
| 1 | 1 | 0 | 0 | Read | RDDAST | Reads status word and 1 data word |
| 1 | 0 | 1 | 1 | Read | Future | Reserved. |
| 1 | 0 | 1 | 0 | Read | Future | Reserved. |
| 1 | 0 | 0 | 1 | Read | Future | Reserved. |
| 1 | 0 | 0 | 0 | Read | Future | Reserved. |
| 0 | 1 | 1 | 1 | Read | Future | Reserved. |
| 0 | 1 | 1 | 0 | Read | Future | Reserved. |
| 0 | 1 | 0 | 1 | Read | Future | Reserved. |
| 0 | 1 | 0 | 0 | Read | Future | Reserved. |
| 0 | 0 | 1 | 1 | Read | Future | Reserved. |
| 0 | 0 | 1 | 0 | Read | Future | Reserved. |
| 0 | 0 | 0 | 1 | Read | Future | Reserved. |
| 0 | 0 | 0 | 0 | Read | Future | Reserved. |

Null Command Description

When a MAP element 112 is not actively receiving a command, all inputs are set to 1 and all internal circuits are held static. Therefore, an incoming command of "1 1 1 1" cannot be decoded as anything and is not used.

RMB

This command, issued during a write transaction, causes the control block 46 chips to generate a global set reset ("GSR") to the user chips of the user array 42 and reprograms the control chips. All internal latches are reset but the configuration of the user chip is not changed. Any data that was waiting to be read will be lost.

RUC

This command, issued during a write transaction, causes the control chips to generate GSR signal to all four user FPGAs of the user array 42. All internal latches are reset, but the configuration is not changed. Any operands will be lost, but data waiting to be read in the control block 46 chips will not.

RECON

This command, issued during a write transaction, causes the control chips to reconfigure the four user FPGAs of the user array 42 with the ROM selected by SEL[2:0]. Any operands still in process will be lost, but data waiting to be read in the control chip will not.

LASTOP

This command is issued during a write transaction to inform the MAP element 112 control block 46 chip that no more operands will be sent and the pipeline should be flushed. The control chips start the pipeline counter and continue to provide read data until the pipeline depth is reached.

WRTOP

This command is issued during a write transaction to inform the MAP element 112 control block 46 chip that it is receiving a valid operand to be forwarded directly to the user circuits.

DONE

This command is issued during a write transaction to inform the MAP element 112 control block 46 chip that the processor 12 is done using the MAP element 112. The control chips reset the busy bit in the status word and wait for a new user. The configuration currently loaded into the user circuits is not altered.

LDROM

This command is issued during a write transaction to inform the MAP element 112 control block 46 chip that the ROM specified by SEL[2:0] is to be reloaded with the contents of the input buffer 40 starting at address 0. This will cause a nonvolatile change to be made to one of the eight on-board algorithms.

START

This command is issued during a write transaction and sends the start address, stop address, auto/user selection and stride to input controller. The input controller then takes control of input buffer 40 and starts transferring operands to the user chips of the user array 42 using these parameters until the stop address is hit. The data word 0 that accompanies this instruction contains the start address in bits 0 through 20, the stop address in bits 23 through 43, the stride in bits 46 through 51 and the user/auto bit in bit position 54. In all cases the least significant bit ("LSB") of each bit group contains the LSB of the value.

RDSTAT

This command is issued during a read transaction to cause a status word to be returned to the processor 12. This transaction will not increment the pipeline counter if it follows a LASTOP command. Details of the status word are shown in the following Table 4.

RDDAT

This command is issued during a read transaction to cause 2 data words to be returned to the processor 12. This transaction will increment the pipeline counter if it follows a LASTOP command. Details of the status word are also shown in Table 4.

RDDAST

This command is issued during a read transaction to cause a status word and data word to be returned to the processor 12.

SEL[2:0] Decode

The SEL[2:0] bits are used for two purposes. When used in conjunction with the RECON or LDROM commands, they determine which of the eight on-board ROM sets are to be used for that instruction. This is defined in the following Table 3.

TABLE 3

| SEL[2:0] Decode | | | |
|---|---|---|---|
| 2 | 1 | 0 | ROM Select Function |
| 0 | 0 | 0 | ROM set 0 |
| 0 | 0 | 1 | ROM set 1 |
| 0 | 1 | 0 | ROM set 2 |
| 0 | 1 | 1 | ROM set 3 |
| 1 | 0 | 0 | ROM set 4 |

TABLE 3-continued

| SEL[2:0] Decode | | | |
|---|---|---|---|
| 2 | 1 | 0 | ROM Select Function |
| 1 | 0 | 1 | ROM set 5 |
| 1 | 1 | 0 | ROM set 6 |
| 1 | 1 | 1 | ROM set 7 |

Status Word Structure

Whenever a read transaction occurs, a status word is returned to the processor 12 issuing the read. The structure of this 64-bit word is as follows:

TABLE 4

Status Word Structure

| Bits | Function |
|---|---|
| 0–7 | Contains the pipeline depth of the current user algorithm |
| 8 | A 1 indicates that the pipeline is empty following a LASTOP command. |
| 9–31 | These lines are tied low and are not used at this time. |
| 32–35 | Contains the current configuration selection loaded into the user FPGA's. |
| 36–58 | These lines are tied low and are not used at this time. |
| 59 | A 1 indicates that data was written and has overflowed the input buffers. |
| 60 | A 1 indicates that a reconfiguration of the user FPGA's is complete. |
| 61 | A 1 indicates that the data word is valid |
| 62 | A 1 indicates that at least 128 words are available |
| 63 | A 1 indicates that the MAP is busy and cannot be used by another processor. |

Note:
Bit 63 is always the most significant bit ("MSB") as indicated in the following illustration:

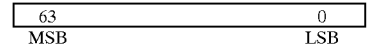

| 63 | 0 |
|---|---|
| MSB | LSB |

Single MAP Element Operation

Normal operation of the MAP elements 112 are as follows. After power up, the MAP element 112 control block 46 chip automatically configures and resets itself. No configuration exists in the four user chips of the user array 42. A processor 12 that wants to use a MAP element 112 first sends an RDSTAT command to the MAP element 112.

If the MAP element 112 is not currently in use, the status word is returned with bit 63 "0" (not busy) and the busy bit is then set to 1 on the MAP element 112. Any further RDSTAT or RDDAST commands show MAP element 112 to be busy.

After evaluating the busy bit and observing it to be "low", the processor 12 issues a RECON command along with the appropriate configuration ROM selection bits set. This causes the MAP element 112 to configure the user chips of the user array 42. While this is happening, status bit 60 is "low". The processor 12 issues an RDSTAT and evaluates bit 60 until it returns "high". At this point, configuration is complete and the user chips of the user array 42 have reset themselves clearing all internal registers. The user then issues an RUC command to ensure that any previous data left in the user array 42 or control block 46 circuits has been cleared.

The user now has two methods available to present data to the MAP element 112. It can either be directly written two quad words at a time into the user chips of the user array 42 or the input buffer 40 can be loaded.

Writing quad words is useful for providing a small number of reference values to the user array 42 but does have lower bandwidth than using the input buffers 40 due to the 128-bit per transfer limit on un-cached writes. To use this mode, a WRTOP command is sent that delivers two 64-bit words to the user circuits. Based on previous knowledge of the algorithm, the program should know how many operands can be issued before an RDDAST could be performed. Evaluating status bits 0 through 7 after configuration also indicates the pipeline depth for this calculation.

If a large data set is to be operated on, or if a large quantity of the operands are to be reused, the input data buffer 40 should be used. In a particular embodiment of the present invention, this buffer may comprise 2M quad words of ESDRAM memory storage. This memory is located on the MAP element 112 and is accessed by performing cache line writes. This allows the loading of four 64-bit words per transaction. Once the data set is loaded, a START command is issued.

The control block 46 chip will assert the lockout bit signaling the memory controller not to access the input buffer 40. It will also evaluate data word "0" of this transaction in accordance with the previously defined fields.

If the Auto/User bit is a "1", the addresses will automatically be generated by the control block 46 chip. The first address will be the start address that was transferred. The address is then incremented by the stride value until the stop address is hit. This address is the last address accessed.

At this point the lockout bit is released and the memory controller can access the input buffer 40. It should be noted that the input control chip must interleave accesses to the input buffer 40 with refresh signals provided by the memory controller in order to maintain the ESDRAM memory while the lockout bit is set.

If the Auto/User bit was a "0", the operation is the same except the addresses are provided to the input control block 46 chip by the user algorithm.

Once the START command is issued, the processor 12 can start to read the output data. The user must first issue a RDDAST, which will return a status word and a data word. If bit 61 of the status word is a 1, the data word is valid. The user will continue this process until status word bit 62 is a 1. At this point the user knows that the output FIFO 74 on the MAP element 112 contains at least 128 valid data words and the RDDAT command can now be used for the next 64 reads. This command will return two valid data words without any status. After the 64 RDDAT commands the user must again issue a RDDAST command and check bits 61 and 62. If neither is set, the FIFO 74 has no further data. If only 61 is set the program should continue to issue RDDAST commands to empty the FIFO 74. If 61 and 62 are set, the program can resume with another set of 64 RDDAT commands and repeat the process until all results are received.

After all data is read and the user has completed his need for a MAP element 112, a DONE command is issued. This will clear the busy flag and allow other processors 12 to use it. It should be noted that data in the input buffer 40 is not corrupted when used and can therefore be reused until a DONE is issued.

Chained MAP Operation MAP elements 112 have the ability to run in a vectored or VMAP™ mode (VMAP is a trademark of SRC Computers, Inc., assignee of the present invention). This mode allows the output data from one MAP element 112 to be sent directly to the user-chips in the user array 42 of the next MAP element 112 with no processor 12 intervention. In a representative embodiment, this link, or chain port 24, operates at up to 800 MB/sec and connects all MAP elements 112 in a system in a chain. A chain must consist of a sequential group of at least two MAP elements 112 and up to as many as the system contains. Multiple non-overlapping chains may coexist.

To use this mode, the user simply designs the algorithm to accept input data from the chainin[00:63] pins. Output data paths are unchanged and always go to both the memory data bus and the chainout[00:63] pins.

VMAP mode operation is identical to single MAP element 112 operation except the data buffer 40 on the first MAP element 112 in the chain is loaded with data and all results are read from the last MAP element 112. Chained MAP elements 112 simultaneously read from their input buffer 40 while accepting operands from the chainin port. This allows the buffers 40 used to supply reference during chained operation. To do this the input buffers 40 must first be loaded and then START commands must be sent to all MAP elements in the chain. The first MAP element 112 in the chain must be the last one to receive a START command. All MAP elements 112 other than the first in the chain must receive a START command with the user address mode selected.

LDROM Operation

MAP elements 112 have the capability to allow the contents of an on-board ROM to be externally reloaded while the system is operating, thus changing the algorithm. It should be noted that-the same ROM for all four user chips in the user array 42 will simultaneously be updated.

To accomplish this, the configuration files of the four ROMs of a given set are converted from a serial stream to 16-bit words. The first words of each ROM file are then combined to form a 64-bit word. User chip 0 of the user array 42 files fill bits 0 through 15, chip 1 is 16 through 31, chip 2 is 31 through 47, and chip 3 is 48 through 64. This process is repeated until all four of the individual files are consumed. This results in a file that is 64-bits wide and 51,935 entries deep.

If the contents of a particular ROM in the set are to be unaltered, its entries must be all 0. At the top of this file, a header word is added that contains all 1's in all bit positions for all ROMs in the set that are to be updated. ROMs that are to be unaltered will contain zeros in this word. This file is then loaded into the MAP element 112 input buffer 40 with the header loaded into address 0.

Upon receiving an LDROM command, the input controller will load the user chips of the user array 42 with a special algorithm that turns them into ROM programmers. These chips will then start accessing the data in the input buffer 40 and will evaluate word 0.

If this is a 0, no further action will be taken by that chip. If it is a 1, the chip will continue to extract data, serialize it, and load it into the ROM that was selected by the state of the SEL lines during the LDROM command. While this is happening, bit 60 of the status word is 0. When complete, bit 60 will return to a 1.

The user must always issue a RECON command following an LDROM command in order to load a valid user algorithm back into the user array 42 and overwrite the ROM programmer algorithm.

Figure 10:
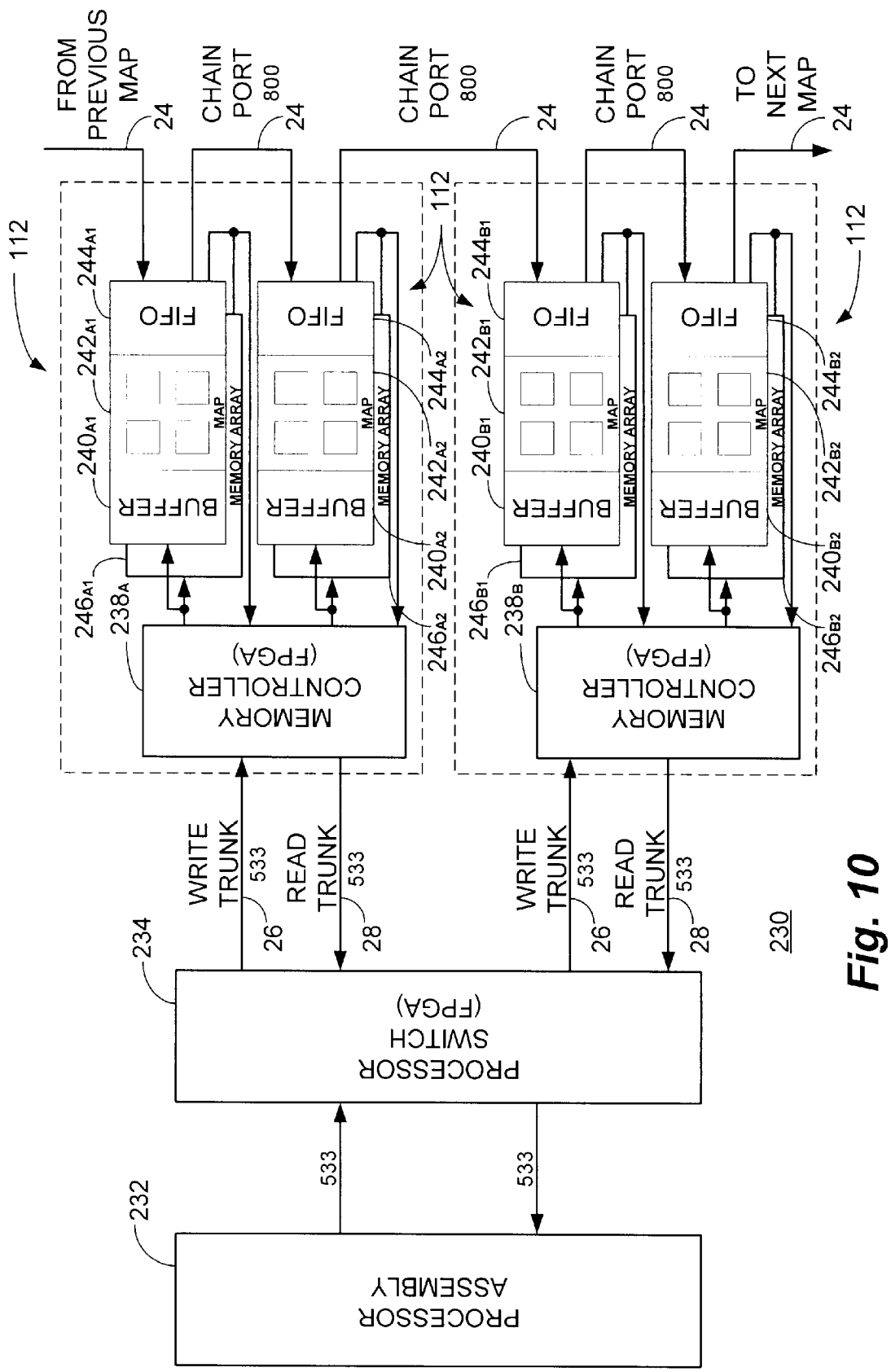
FIG. 10 is a functional block diagram of another alternative embodiment of the present invention wherein individual MAP elements are closely associated with individual memory arrays and each of the MAP elements comprises independent chain ports for coupling the MAP elements directly to each other.

With reference additionally now to FIG. 10, a functional block diagram of another alternative embodiment 230 of the present invention is shown wherein individual MAP elements 112 are closely associated with individual memory arrays and each of the MAP elements 112 comprises independent chain ports 24 for coupling the MAP elements 112 directly to each other. The system illustrated comprises a processor assembly comprising one or more processors 12 bi-directionally coupled through a processor switch (which may comprise an FPGA) to a write trunks 26 and read trunks 28.

In the example illustrated, a number of MAP elements 112 are associated with a particular memory array 246 under control of a memory controller 238 (which may also comprise an FPGA). As illustrated, each of the memory controllers 238$_A$ and 238$_B$ are coupled to the processor assembly 232 through the processor switch 234 by means of the write and read trunks 26, 28. Each of the memory controllers may be coupled to a plurality of MAP elements 112 and associated memory array 246 and to additional MAP elements 112 by means of a chain port 24 as previously described. In the embodiment illustrated, memory controller 238$_A$ is in operative association with a pair of MAP elements, the first comprising buffer 240$_{A1}$, user array 242$_{A1}$ and FIFO 244$_{A1}$ associated with memory array 246$_{A1}$ and the second comprising buffer 240$_{A2}$, user array 242$_{A2}$ and FIFO 244$_{A2}$ associated with memory array 246$_{A2}$. In like manner, memory controller 238$_B$ is in operative association with a pair of MAP elements, the first comprising buffer 240$_{B1}$, user array 242$_{B1}$ and FIFO 244$_{B1}$ associated with memory array 246$_{B1}$ and the second comprising buffer 240$_{B2}$, user array 242$_{B2}$ and FIFO 244$_{B2}$ associated with memory array 246$_{B2}$.

Figure 11A:
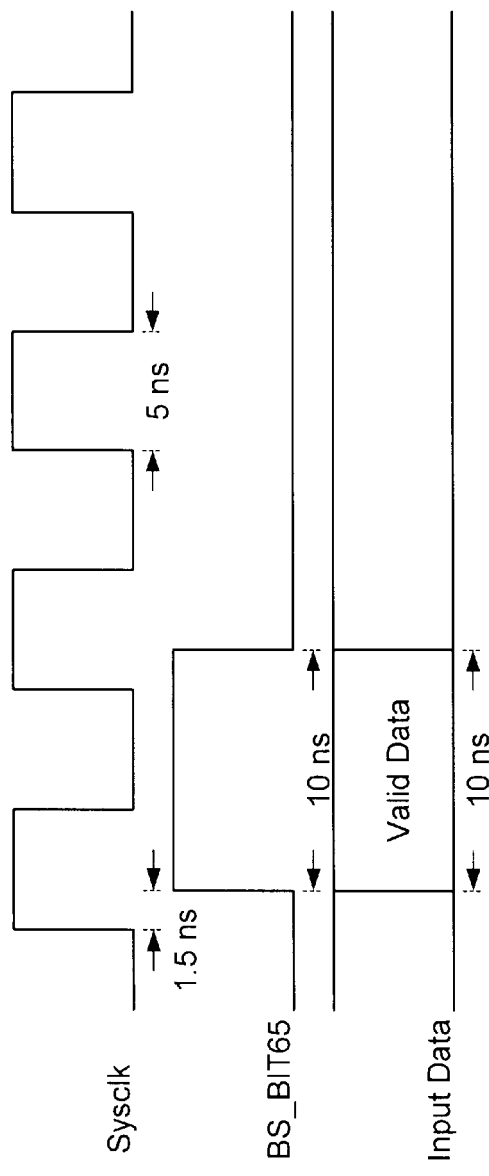
FIGS. 11A and 11B are timing diagrams respectively illustrating input and output timing in relationship to the system clock ("Sysclk") signal
Figure 11B:
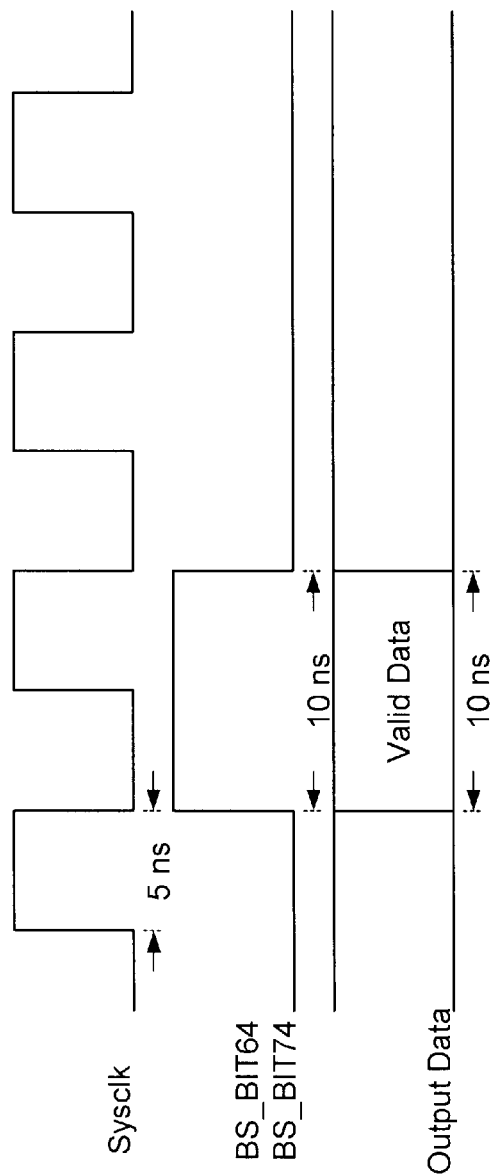

With reference additionally now to FIG. 11A and 11B separate timing diagrams are illustrated respectively depicting input and output timing in relationship to the system clock ("Sysclk") signal.

Interface Timing

The MAP element 112 user array 42 can accept data from the input memory bus, input buffer 40 or the chain port 24. In the embodiment of the present invention previously described and illustrated, all sixty four bits from any of these sources are sent to all four of the user chips (202, 204, 206 and 208; FIG. 9) along with a VALID IN signal on lines 68 (FIG. 8) sent from the control block 46 that enables the input clock in the user chips of the user array 42.

This signal stays high for ten, twenty or forty nanoseconds depending on whether one, two or four words are being transferred. This VALID IN signal on lines 68 connects to the clock enable pins of input latches in the user chips of the user array 42. These latches then feed the user circuit in the MAP element 112. The timing for the various write operations is shown in with particularity in FIG. 11A.

Input Timing

After the algorithm operation has completed, output data is formed into 64-bit words-in the user chips of the user array 42 on pins connected to the DOUT[00:63] nets. These nets, in turn, connect to the output FIFO 74 (FIG. 8) that ultimately provides the read data to the memory controller or the next MAP element 112 in the chain. After forming the 64-bit result, the user circuitry must ensure that a "FULL" signal is "low". When the signal is "low", the transfer is started by providing a "low" from the user array 42 to the control block 46 and the FIFO#WE input on the FIFO 74.

At the same time, valid data must appear on the data out ("DOUT") nets. This data must remain valid for 10 nanoseconds and FIFO#WE must remain "low" until the end of this 10-nanosecond period. If multiple words are to be transferred simultaneously, the FIFO#WE input must remain "low" until the end of this 10-nanosecond period as shown with particularity in FIG. 11B.

Output Timing

Three result words can be transferred out of the user array 42 before a "read" should occur to maximize the "read" bandwidth. The output FIFO 74 (FIG. 8) is capable of holding 512 k words in the embodiment illustrated. When three words are held in the control block 46, the word counter in the status word will indicate binary "11".

Pipeline Depth

To aid in system level operation, the user array 42 must also provide the pipeline depth of the algorithm to the control block 46. In a particular embodiment of the present invention, this will be equal to the number of 100-MHz clock cycles required to accept a data input word, process that data, and start the transfer of the results to the FIFO 74.

If an algorithm is such that initialization parameters or reference numbers are sent prior to actual operands, the pipeline depth is equal only to the number of clock cycles required to process the operands. This depth is provided as a static 8-bit number on nets DOUT[64:71] from FPGAs 202 and/or 204 (FIG. 9). Each of the eight bits are generally output from only of the FPGAs of the user array 42 but the eight bits may be spread across both chips.

In a particular embodiment of the present invention, the ROMs that are used on the MAP elements 112 may be conveniently provided as ATMEL™ AT17LVO1O in a 20-pin PLCC package. Each ROM contains the configuration information for one of the four user FPGAs of the user array 42. There may be eight or more ROM sockets allocated to each of the user chips of the user array 42 to allow selection of up to eight or more unique algorithms. In an embodiment utilizing eight ROMs, the first ROM listed for each of the four user chips may be selected by choosing configuration 0h and the last ROM selected by choosing configuration 8h.

If all four user chips of the user array 42 are not needed for an algorithm, the unused chips do not require that their ROM sockets be populated. However, at least one of the user chips must always contain a correctly programmed ROM even if it is not used in the algorithm because signals related to the configuration timing cycle are monitored by the control block. The user FPGA that directly connects to both the DIN and DOUT signals, should always be used first when locating the algorithm circuit.

Figure 12:
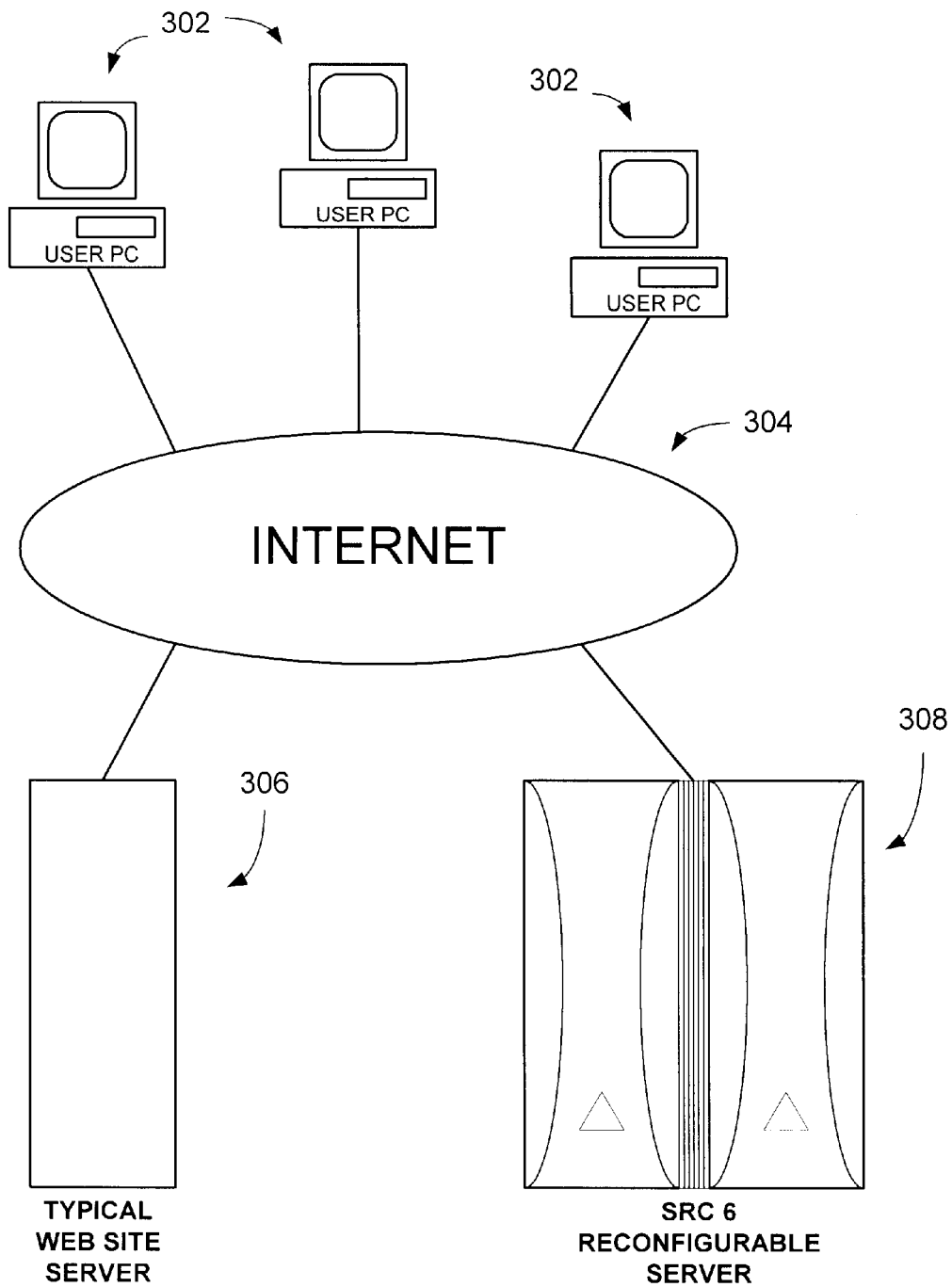
FIG. 12 is a simplified illustration of a representative operating environment for the system and method of the present invention including a typical web site server as would be replaced by an SRC-6 reconfigurable server.

With reference additionally now to FIG. 12, a simplified illustration of a representative operating environment 300 for the system and method of the present invention is shown including a typical web site server 306 as would be replaced by, for example, an SRC-6 reconfigurable server 308 (comprising, for example, the multiprocessor computer 10 or computer system 20 of the preceding figures) or other computer system incorporating one or more industry standard processors together with one or more reconfigurable processors having all of the processor controlled by a single system image of the operating system. In this simplified illustration, a number of personal computers 302 or other computing devices are coupled to either the typical web site server 306 (in a prior art implementation) or the reconfigurable sever 308 (in accordance with the system and method of the present invention) through the Internet 304.

Figure 13:
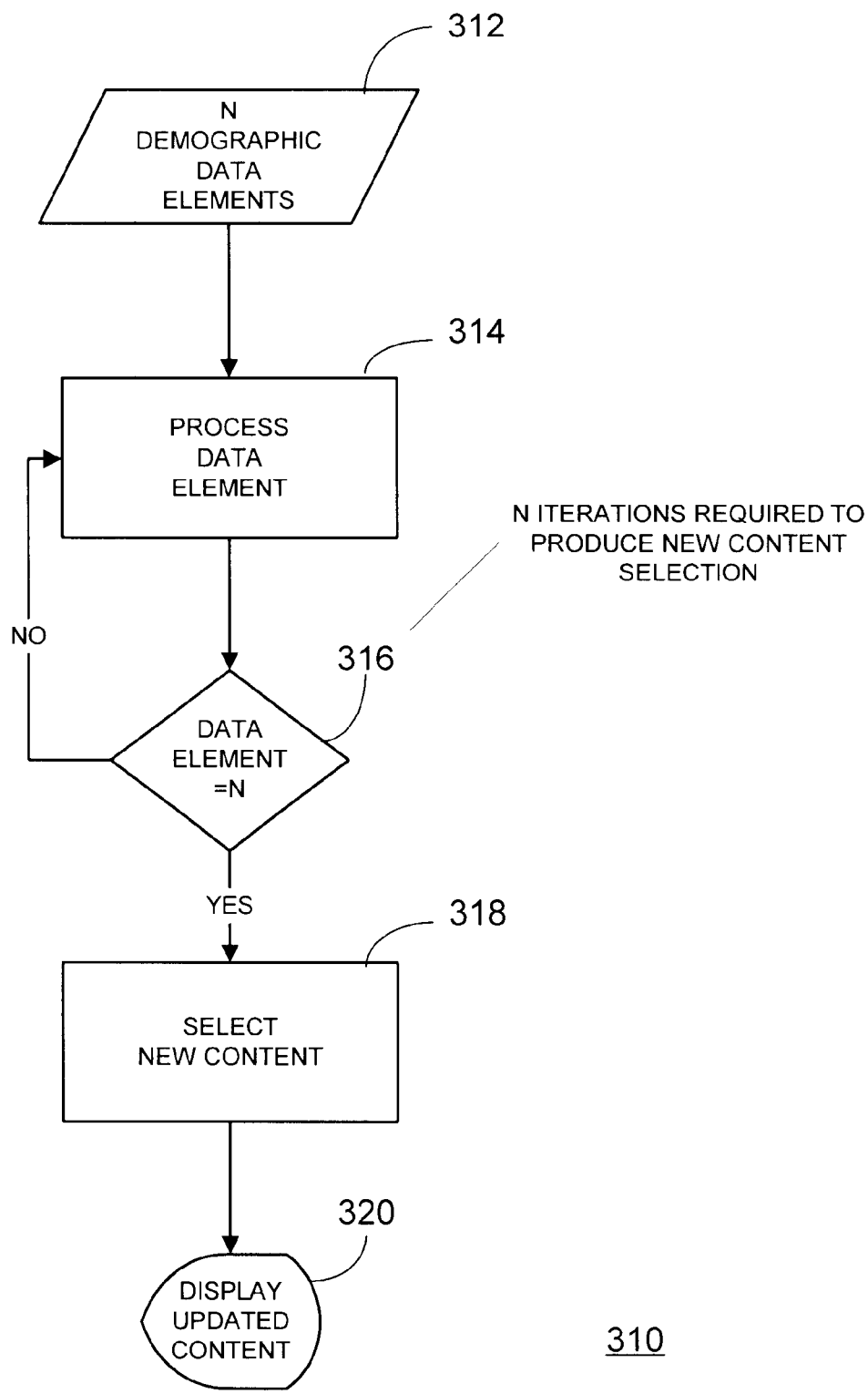
FIG. 13 is a flowchart illustrating a conventional data processing sequence in a conventional application of the typical web site server depicted in the preceding figure.

With reference additionally now to FIG. 13, a flowchart is shown illustrating a conventional data processing sequence 310 in a conventional application of a typical web site server 306 as depicted in the preceding figure. The sequence 310 begins with the input of a number "N" of demographic data elements for processing by the typical web site server 306. These N data elements are then serially processed at step 314 until the last of the data elements is determined and processed at decision step 316. Therefore, N iterations by the microprocessor of the typical web site server 306 are required to complete processing of the input data elements.

Following this protracted data processing period, the typical web site server 306 then can undertake to select the new web page content specifically adapted to the particular web site visitor at step 318, which updated site content is displayed at step 320.

Figure 14:
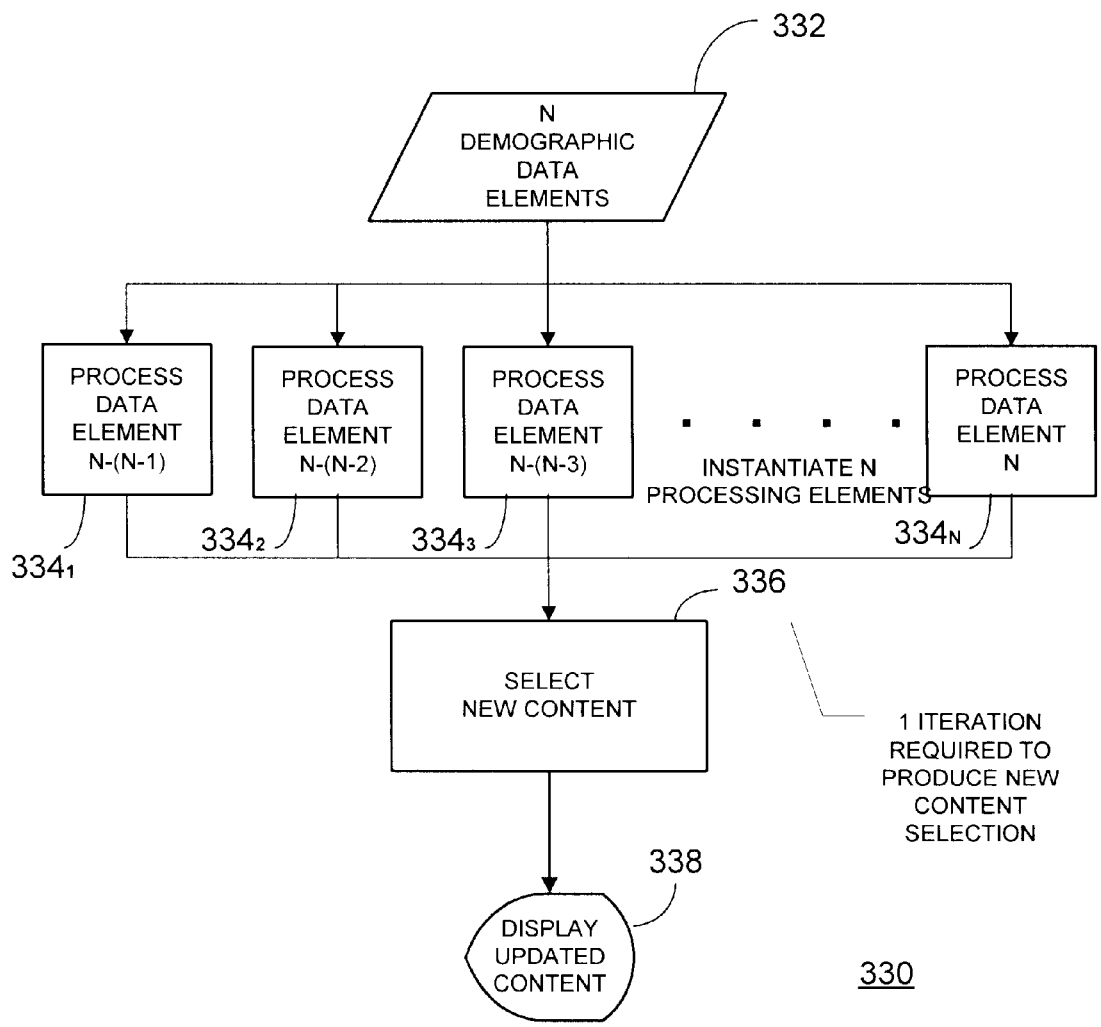
FIG. 14 is a corresponding flowchart illustrating the processing of demographic or other data utilizing a reconfigurable server for implementing the system and method of the present invention and which results in significantly improved access and data processing times.

With reference additionally now to FIG. 14, a corresponding flowchart is shown illustrating the processing of demographic or other data utilizing the reconfigurable server 308 of FIG. 12 in a significantly faster data processing sequence 330. The processing sequence 330 again begins with the input of N demographic data elements or other secure socket, database or other data for processing by the site server at input step 332. Importantly, the reconfigurable server 308 is now able to process the individual data elements in parallel through the use of a single reconfigurable processor, (such as a MAP element), due to its ability to instantiate more than one processing unit that is tailored to the job as opposed to reusing one or two processing units located within a microprocessor. In the exemplary embodiment shown, all of reconfigurable processors may share all of the system's resources and be controlled by a single system image of the operating system although, in alternative embodiments, cluster management software may be utilized to effectively make a cluster of microprocessors appear to a user to be but a single copy of the operating system. In any event, the completion of steps $334_1$ through $334_N$ requires only 1 iteration to prepare the site to select the new content at step 336 and then display it at step 338.

While there have been described above the principles of the present invention in conjunction with one or more specific embodiments of the present invention and MAP elements, it is to be clearly understood that the foregoing description is made only by way of example and not as a limitation to the scope of the invention. Particularly, it is recognized that the teachings of the foregoing disclosure will suggest other modifications to those persons skilled in the relevant art for use in processing differing types of data at a web site. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for processing data at an internet site comprising:
providing a reconfigurable server at said site incorporating at least one microprocessor and at least one reconfigurable processing element;
receiving N data elements at said site relative to a remote computer coupled to said site;
instantiating N of said reconfigurable processing elements at said reconfigurable server; and
processing said N data elements with corresponding ones of said N reconfigurable processing elements.

2. The method of claim 1 further comprising:
selecting a content of said site in response to said processed N data elements.

3. The method of claim 2 further comprising:
transmitting said content to said remote computer.

4. The method of claim 3 further comprising:
displaying said content at said remote computer.

5. The method of claim 1 wherein said N data elements comprise demographic data pertaining to said remote computer.

6. The method of claim 1 wherein said N data elements comprise N encrypted data elements transmitted by said remote computer to said site.

7. The method of claim 6 wherein said step of processing said N data elements comprises:
decrypting said N encrypted data elements.

8. The method of claim 1 wherein said N data elements comprise N database query elements.

9. The method of claim 8 wherein said step of processing said N data elements comprises:
processing said N database query elements.

10. The method of claim 1 further comprising:
controlling said at least one microprocessor and at least a portion of said at least one reconfigurable processing element by a single system image of an operating system.

11. An internet processing acceleration service comprising:
a reconfigurable server coupled to said internet, said server comprising at least one microprocessor and at least one reconfigurable processor; and
a single system image of an operating system controlling said at least one microprocessor and at least a portion of said at least one reconfigurable processors;
said service instantiating N of said at least a portion of said at least one reconfigurable processors for substantially parallel processing of N data elements received by said server.

12. The service of claim 11 wherein said N data elements comprise demographic data pertaining to a computer coupled to said server by means of said internet.

13. The service of claim 12 wherein said server selects a content for transmission to said computer by means of said internet based upon said demographic data.

14. The service of claim 11 wherein said N data elements comprise encrypted data elements transmitted to said server by a computer coupled to said internet.

15. The service of claim 14 wherein said server is operative to decrypt said encrypted data elements.

16. The service of claim 11 wherein said N data elements comprise database query elements.

17. The service of claim 16 wherein said server is operative to process said data base query.

18. A process of accelerating access time of a remote computer to an internet site comprising:
providing a reconfigurable server at said site incorporating at least one microprocessor and at least one reconfigurable processor;
transmitting N data elements from said remote computer to said server;
substantially concurrently processing said N data elements with N of said at least one reconfigurable processors;
selecting a content of said internet site in response to said N data elements; and
transmitting said content to said remote computer.

19. The process of claim 18 wherein said N data elements comprise demographic data pertaining to said remote computer.

20. The process of claim 18 wherein said N data elements comprise N encrypted data elements.

21. The process of claim 20 wherein said step of substantially concurrently processing said N data elements comprises:

decrypting said N encrypted data elements.

22. The process of claim 18 wherein said N data elements comprise N database query elements.

23. The process of claim 22 wherein said step of substantially concurrently processing said N data elements comprises:

processing said N database query elements.

24. The process of claim 18 further comprising:

controlling said at least one microprocessor and at least a portion of said at least one reconfigurable processors by a single system image of an operating system.

25. The process of claim 18 further comprising:

displaying said content at said remote computer.

* * * * *